United States Patent
Kubo et al.

(10) Patent No.: US 7,800,641 B2
(45) Date of Patent: Sep. 21, 2010

(54) LIGHT SOURCE UNIT, OPTICAL SCAN APPARATUS, AND IMAGE FORMATION APPARATUS

(75) Inventors: Nobuaki Kubo, Tokyo (JP); Tomohiro Nakajima, Yokohama (JP); Taku Amada, Yamato (JP); Yoshinori Hayashi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 14 days.

(21) Appl. No.: 12/222,898

(22) Filed: Aug. 19, 2008

(65) Prior Publication Data

US 2009/0052944 A1 Feb. 26, 2009

(30) Foreign Application Priority Data

| Aug. 20, 2007 | (JP) | ............................. 2007-213915 |
| Aug. 31, 2007 | (JP) | ............................. 2007-226178 |
| Mar. 27, 2008 | (JP) | ............................. 2008-082308 |

(51) Int. Cl.
 *B41J 2/447* (2006.01)
(52) U.S. Cl. ........................................ 347/245; 347/263
(58) Field of Classification Search ................. 347/241, 347/242, 245, 256, 257, 263
 See application file for complete search history.

(56) References Cited

U.S. PATENT DOCUMENTS

| 4,853,710 | A | 8/1989 | Shimada et al. |
| 5,633,744 | A | 5/1997 | Nakajima |
| 5,671,077 | A | 9/1997 | Imakawa et al. |
| 5,753,907 | A | 5/1998 | Nakajima et al. |
| 5,786,594 | A | 7/1998 | Ito et al. |
| 5,793,408 | A | 8/1998 | Nakajima |
| 5,936,756 | A | 8/1999 | Nakajima |
| 5,952,649 | A | 9/1999 | Amada |
| 5,999,345 | A | 12/1999 | Nakajima et al. |
| 6,052,211 | A | 4/2000 | Nakajima |
| 6,091,534 | A | 7/2000 | Nakajima |
| 6,185,026 | B1 | 2/2001 | Hayashi et al. |
| 6,198,562 | B1 | 3/2001 | Hayashi et al. |
| 6,317,246 | B1 | 11/2001 | Hayashi et al. |
| 6,376,837 | B1 | 4/2002 | Itabashi et al. |
| 6,400,391 | B1 | 6/2002 | Suhara et al. |
| 6,462,853 | B2 | 10/2002 | Hayashi |
| 6,587,245 | B2 | 7/2003 | Hayashi |
| 6,621,512 | B2 | 9/2003 | Nakajima et al. |

(Continued)

FOREIGN PATENT DOCUMENTS

JP 2908652 4/1999

(Continued)

*Primary Examiner*—Huan H Tran
(74) *Attorney, Agent, or Firm*—Dickstein Shapiro LLP

(57) ABSTRACT

A light source unit is provided, which includes a light source with a plurality of light emission portions two-dimensionally arranged; a substrate on which the light source is mounted; a first support portion supporting the substrate; a bias member biasing the substrate towards the first support portion; a coupling element coupling a light beam emitted from the light source; a second support portion supporting the coupling element; a holding member holding a position of the substrate relative to the first support portion, a fitting portion provided in each of the first and second support portions to rotatably fit the first and second support portions into each other around an optical axis of the light source; and a fastening member integrally fastening the first and second support portions.

7 Claims, 31 Drawing Sheets

U.S. PATENT DOCUMENTS

| | | |
|---|---|---|
| 6,657,765 B2 | 12/2003 | Hayashi et al. |
| 6,744,545 B2 | 6/2004 | Suhara et al. |
| 6,757,089 B2 | 6/2004 | Hayashi |
| 6,768,506 B2 | 7/2004 | Hayashi et al. |
| 6,771,296 B2 | 8/2004 | Hayashi et al. |
| 6,771,300 B2 | 8/2004 | Amada et al. |
| 6,771,407 B2 | 8/2004 | Hayashi et al. |
| 6,775,041 B1 | 8/2004 | Nakajima |
| 6,788,444 B2 | 9/2004 | Suzuki et al. |
| 6,803,941 B2 | 10/2004 | Hayashi et al. |
| 6,839,157 B2 | 1/2005 | Ono et al. |
| 6,867,890 B2 | 3/2005 | Suzuki et al. |
| 6,870,652 B2 | 3/2005 | Suhara et al. |
| 6,903,856 B2 | 6/2005 | Hayashi |
| 6,906,739 B2 | 6/2005 | Suzuki et al. |
| 6,932,271 B2 | 8/2005 | Nakajima et al. |
| 6,934,061 B2 | 8/2005 | Ono et al. |
| 6,937,371 B2 | 8/2005 | Hayashi et al. |
| 6,956,685 B2 | 10/2005 | Hayashi |
| 6,972,883 B2 | 12/2005 | Fujii et al. |
| 6,977,762 B2 | 12/2005 | Hayashi |
| 6,987,593 B2 | 1/2006 | Hayashi et al. |
| 6,995,885 B2 | 2/2006 | Nakajima |
| 7,006,120 B2 | 2/2006 | Sakai et al. |
| 7,050,082 B2 | 5/2006 | Suzuki et al. |
| 7,050,210 B2 | 5/2006 | Atsuumi et al. |
| 7,068,296 B2 | 6/2006 | Hayashi et al. |
| 7,072,127 B2 | 7/2006 | Suhara et al. |
| 7,075,688 B2 | 7/2006 | Nakajima |
| 7,088,484 B2 | 8/2006 | Hayashi et al. |
| 7,106,483 B2 | 9/2006 | Hayashi et al. |
| 7,145,589 B2 | 12/2006 | Amada et al. |
| 7,145,705 B2 | 12/2006 | Hayashi |
| 7,154,651 B2 | 12/2006 | Atsuumi et al. |
| 7,164,516 B2 | 1/2007 | Hayashi et al. |
| 7,170,660 B2 | 1/2007 | Nakajima |
| 7,206,014 B2 | 4/2007 | Amada et al. |
| 7,221,493 B2 | 5/2007 | Fujii et al. |
| 7,233,425 B2 | 6/2007 | Hayashi |
| 7,236,281 B2 | 6/2007 | Hayashi et al. |
| 7,245,311 B2 | 7/2007 | Hayashi et al. |
| 7,253,937 B2 | 8/2007 | Ueda et al. |
| 7,271,824 B2 | 9/2007 | Omori et al. |
| 7,298,537 B2 | 11/2007 | Hayashi et al. |
| 7,301,554 B2 | 11/2007 | Kubo |
| 7,315,409 B2 | 1/2008 | Hayashi |
| 7,333,254 B2 | 2/2008 | Amada et al. |
| 7,362,486 B2 | 4/2008 | Hayashi et al. |
| 7,372,604 B2 | 5/2008 | Hayashi |
| 7,397,591 B2 | 7/2008 | Hayashi et al. |
| 7,411,712 B2 | 8/2008 | Nakajima et al. |
| 2002/0122217 A1 | 9/2002 | Nakajima |
| 2003/0053156 A1 | 3/2003 | Satoh et al. |
| 2004/0036936 A1 | 2/2004 | Nakajima et al. |
| 2004/0184127 A1 | 9/2004 | Nakajima et al. |
| 2005/0024479 A1 | 2/2005 | Itabashi et al. |
| 2005/0062836 A1 | 3/2005 | Nakajima |
| 2005/0105156 A1 | 5/2005 | Ono et al. |
| 2005/0179971 A1 | 8/2005 | Amada et al. |
| 2005/0185237 A1 | 8/2005 | Nakajima |
| 2005/0190420 A1 | 9/2005 | Imai et al. |
| 2006/0012844 A1 | 1/2006 | Fujii et al. |
| 2006/0028533 A1 | 2/2006 | Nakajima |
| 2006/0132880 A1 | 6/2006 | Amada et al. |
| 2006/0158711 A1 | 7/2006 | Imai et al. |
| 2006/0209166 A1 | 9/2006 | Suzuki et al. |
| 2006/0232660 A1 | 10/2006 | Nakajima et al. |
| 2006/0232844 A1 | 10/2006 | Nakajima |
| 2006/0238845 A1 | 10/2006 | Atsuumi et al. |
| 2006/0245009 A1 | 11/2006 | Akiyama et al. |
| 2006/0256185 A1 | 11/2006 | Suzuki et al. |
| 2006/0284968 A1 | 12/2006 | Hayashi et al. |
| 2007/0035796 A1 | 2/2007 | Nakajima |
| 2007/0058232 A1 | 3/2007 | Nakajima |
| 2007/0058255 A1 | 3/2007 | Imai et al. |
| 2007/0081152 A1 | 4/2007 | Amada |
| 2007/0097474 A1 | 5/2007 | Amada et al. |
| 2007/0146738 A1 | 6/2007 | Nakajima |
| 2007/0146851 A1 | 6/2007 | Nakajima |
| 2007/0146856 A1 | 6/2007 | Nakajima |
| 2007/0189008 A1 | 8/2007 | Amada et al. |
| 2007/0206259 A1 | 9/2007 | Nakajima |
| 2007/0206261 A1 | 9/2007 | Hayashi et al. |
| 2007/0211324 A1 | 9/2007 | Sakai et al. |
| 2007/0242127 A1 | 10/2007 | Omori et al. |
| 2007/0253048 A1 | 11/2007 | Sakai et al. |
| 2007/0297036 A1 | 12/2007 | Nakamura et al. |
| 2008/0024589 A1 | 1/2008 | Ueda et al. |
| 2008/0024590 A1 | 1/2008 | Nakajima |
| 2008/0024849 A1 | 1/2008 | Hayashi et al. |
| 2008/0025759 A1 | 1/2008 | Ichii et al. |
| 2008/0055690 A1 | 3/2008 | Nakamura et al. |
| 2008/0055692 A1 | 3/2008 | Saisho et al. |
| 2008/0062491 A1 | 3/2008 | Nakamura et al. |
| 2008/0068689 A1 | 3/2008 | Saisho et al. |
| 2008/0068693 A1 | 3/2008 | Hayashi et al. |
| 2008/0069585 A1 | 3/2008 | Amada |
| 2008/0123159 A1 | 5/2008 | Hayashi et al. |
| 2008/0170282 A1 | 7/2008 | Amada et al. |
| 2008/0180772 A1 | 7/2008 | Miyatake et al. |
| 2008/0192323 A1 | 8/2008 | Nakamura et al. |
| 2008/0204840 A1 | 8/2008 | Watanabe et al. |
| 2008/0204841 A1 | 8/2008 | Suzuki et al. |
| 2008/0204852 A1 | 8/2008 | Amada et al. |
| 2008/0218827 A1 | 9/2008 | Watanabe et al. |

FOREIGN PATENT DOCUMENTS

| | | |
|---|---|---|
| JP | 2002-341273 | 11/2002 |
| JP | 2003-211728 | 7/2003 |
| JP | 2004-6592 | 1/2004 |

ORIENTATION OF LIQUID CRYSTALS

POTENTIAL GRADIENT

REFRACTIVE INDEX DISTRIBUTION

LIGHT SOURCE UNIT, OPTICAL SCAN APPARATUS, AND IMAGE FORMATION APPARATUS

CROSS-REFERENCE TO RELATED APPLICATION

The present application is based on and claims priority from Japanese Patent Application No. 2007-213915, filed on Aug. 20, 2007, No. 2007-226178, filed on Aug. 31, 2007, and No. 2008-82308, filed on Mar. 27, 2008, the disclosure of which is hereby incorporated by reference in its entirety.

BACKGROUND OF THE INVENTION

1. Field of the Invention

The present invention relates to a light source unit emitting a light beam, an optical scan apparatus scanning a scan surface with a plurality of light beams and an image formation apparatus incorporating such an optical scan apparatus.

2. Description of Related Art

In the prior art, an image formation apparatus forming images by Carlson process is known. For example, Japanese Laid-open Patent Application Publication No. 2002-341273 discloses such an image formation apparatus which scans the surface of a rotating photoconductive drum with a light beam to form an electrostatic latent image, visualizes the electrostatic latent image as a toner image, and fuses the toner image on a sheet of paper as a recording medium to form an image. This type of the image formation apparatus has been popularly used in simple printmaking for an on-demand print system. There has been increasing demand for high-density images and high-speed image outputs.

Japanese Laid-open Patent Application Publication No. 2003-211728, for example, discloses an image formation apparatus which has a light source such as a vertical cavity surface emitting laser (VCSEL) array with plural light emission portions two-dimensionally, monolithically arranged and is capable of concurrently scanning a scan surface with plural light beams.

Such a vertical cavity surface emitting laser array used in the image formation apparatus is composed of the light emission portions on a chip contained in a package, which is made of a ceramic material or the like. For mounting the light emission portions on a circuit board by soldering, the mounted light emission portions are not uniform in height. With such non-uniformity in height, the surface of the package is inclined relative to the surface of the circuit board. As a result, positional relations between the individual light emission portions and the circuit board surface may not be the same.

In such a light source unit the positions of optical elements such as a coupling element (lens) are often determined on the basis of the circuit board surface. In this case, there will be a problem that the positional difference between each light emission portion and the circuit board surface leads to a positional difference between the optical elements and each light emission portion.

In order to form images in high quality by an image formation apparatus, the light source unit need be disposed at a precise position relative to the optical system. For example, the light emission portions have to be positioned precisely relative to the coupling element at unit of several µm. With a low precision, beam spot sizes or pitches of light illuminating photoconductive drums are adversely affected, resulting in significantly deteriorating image quality.

For prevention of such a problem, Japanese Laid-open Patent Application Publication No. 2004-6592 discloses a method for positioning the package surface relative to the optical elements in a semiconductor laser unit by elastically bending the circuit board to bring the package into contact with the surface of a support member by pressure.

However, such a method still has a problem that enforcedly bending the circuit board causes solder of electric components mounted thereon to be peeled off, which may adversely accelerate deterioration of the laser unit over time, for example.

Furthermore, there is another problem in fixation of the light emission portions that since they are fixed to the package by an epoxy adhesive or the like, it is hard to precisely position them on the package even by use of a jig or the like. It is not possible to accurately set the position of the light source relative to the optical system.

SUMMARY OF THE INVENTION

In view of solving the above problems, an object of the present invention is to provide a light source unit in which a light source can be precisely positioned relative to an optical system at three places, so as to stably form high quality images, as well as to provide an optical scan apparatus incorporating such a light source unit and an image formation apparatus incorporating such an optical scan apparatus.

According to one aspect of the present invention, a light source unit comprises a light source with a plurality of light emission portions two-dimensionally arranged, a substrate on which the light source is mounted, a first support portion supporting the substrate, a bias member biasing the substrate towards the first support portion, a coupling element coupling a light beam emitted from the light source, a second support portion supporting the coupling element, a holding member holding a position of the substrate relative to the first support portion, a fitting portion provided in each of the first and second support portions to rotatably fit the first and second support portions into each other around an optical axis of the light source, and a fastening member integrally fastening the first and second support portions.

Preferably, the light source comprises a light emitting element including a plurality of light emission portions and a package containing the light emitting element. Further, in order to position the light source relative to the first support portion, the bias member biases the substrate towards the first support portion to make the package in contact with the first support portion.

Preferably, the bias member comprises an anchor portion which latches the substrate to restrict movement thereof in a direction orthogonal to the optical axis of the light source.

Preferably, the light source unit further comprises a rotatable adjuster which is configured to rotate the second support portion in a plane orthogonal to the optical axis of the light source for positional adjustment.

Preferably, the light source unit further comprises a connector mounted on the substrate and connected with a wiring from outside, in which the holding member holds neighborhood of a portion of the substrate on which the connector is mounted.

According to another aspect of the present invention, an optical scan apparatus scanning a scan surface with a light beam comprises the light source unit according to the present invention, an optical deflector deflecting a light beam emitted from the light source unit, an optical imaging system focusing the light beam deflected by the optical deflector on the scan surface.

According to another aspect of the present invention, an image formation apparatus which forms a toner image according to an electrostatic latent image obtained from image information, and fuses the toner image on a recording medium to form an image, comprises the optical scan apparatus according the present invention, a photoconductive drum on which an electronic latent image is formed by the optical scan apparatus, a develop unit visualizing the electrostatic latent image formed on the photoconductive drum, and a transfer unit fusing the toner image visualized by the develop unit on a recording medium.

BRIEF DESCRIPTION OF THE DRAWINGS

FIG. 7B is a plain view of a light emitting element 10a;

DETAILED DESCRIPTION OF THE PREFERRED EMBODIMENTS

First Embodiment

Figure 1:
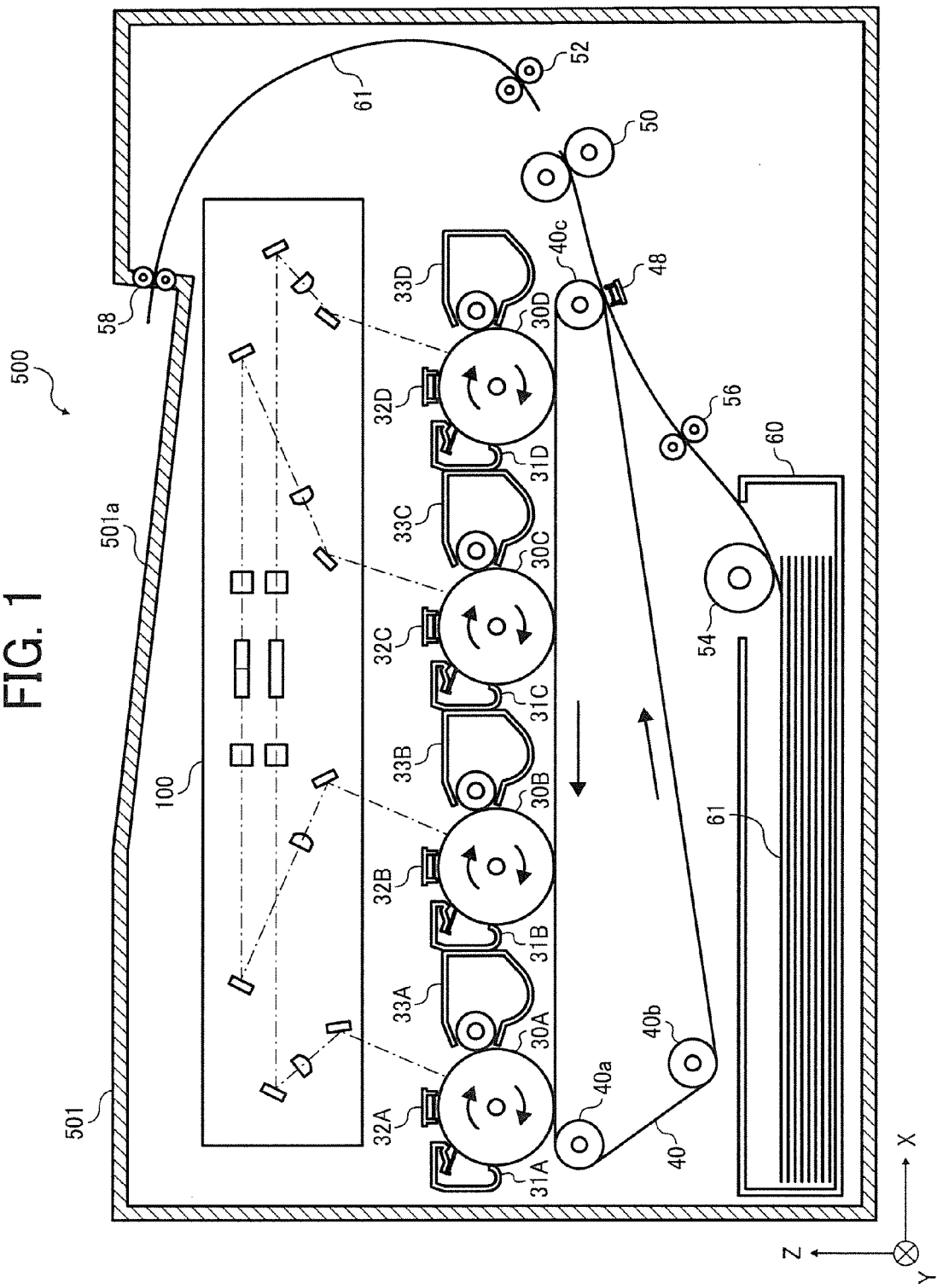
FIG. 1 is a schematic view of an image formation apparatus 500 according to the first embodiment of the present invention.

Hereinafter, the first embodiment of the present invention will be described in detail with reference to FIGS. 1 to 9. FIG. 1 shows an image formation apparatus 500 according to the present embodiment.

The image formation apparatus 500 is, for example, a tandem type color printer which prints multi-color images by superimposing and transferring black, yellow, magenta, and cyan color toner images onto sheets of paper. The image formation apparatus 500 as shown in FIG. 1 comprises an optical scan apparatus 100, four photoconductive drums 30A to 30D, a transfer belt 40, a paper feed tray 60, a paper feed roller 54, a first resist roller 56, a second resist roller 52, a fuse roller 50, a paper discharge roller 58, a not-shown controller collectively controlling the respective components, and a housing 501 in rectangular solid shape accommodating the components.

A paper discharge tray 501a on which printed sheets are discharged is formed on the top surface of the housing 501. The optical scan apparatus 100 is disposed under the paper discharge tray 501a.

The optical scan apparatus 100 scans the photoconductive drum 30A with a light beam for black image components modulated by image information supplied from a higher-level device (such as personal computer). Similarly, it scans the photoconductive drum 30B with a light beam for cyan image components, the photoconductive drum 30C with a light beam for magenta image components, and the photoconductive drum 30D with a light beam for yellow image components. The structure of the optical scan apparatus 100 will be described later.

The four photoconductive drums 30A to 30D are cylindrical members and have photoconductive layers on their surfaces which become electrically conductive when illuminated with a light beam. They are disposed with equal interval in an X-axis direction under the optical scan apparatus 100 in FIG. 1.

The photoconductive drum 30A is disposed at end of a reverse X-axis direction (left side in FIG. 1) inside the housing 15 so that its longitudinal direction is to be the Y-axis direction. The photoconductive drum 30A is rotated by a not-shown rotation mechanism clockwise (as indicated by black arrows) in FIG. 1. Around the photoconductive drum 30A disposed are an electric charger 32A at 12 o'clock position (upper side), a toner cartridge 33A at 2 o'clock position and a cleaning case 31A at 10 o'clock position.

The electric charger 32A is disposed with a predetermined clearance over the surface of the photoconductive drum 30A with its longitudinal direction as the Y-axis direction. It electrically charges the surface of the photoconductive drum 30A with a predetermined voltage.

The toner cartridge 33A includes a cartridge body containing a toner of black image components and a develop roller charged with a voltage of reverse polarity of that of the photoconductive drum 30A, and the like. The toner cartridge 33A supplies the toner in the cartridge body to the surface of the photoconductive drum 30A via the develop roller.

The cleaning case 31A is provided with a cleaning blade of a rectangular shape with its longitudinal direction as the Y-axis direction, and it is disposed so that one end of the cleaning blade gets in contact with the surface of the photoconductive drum 30A. The toner sticking on the surface of the photoconductive drum 30A is removed by the cleaning blade along with the rotation of the photoconductive drum 30A and collected in the cleaning case 31A.

The photoconductive drums 30B, 30C, 30D with the same structure as that of the photoconductive drum 30A are placed in sequence on the right side of the photoconductive drum 30A with a predetermined interval. They are rotated by a not-shown rotation mechanism clockwise (as indicated by the black arrows) in FIG. 1. Similarly to the photoconductive drum 30A, electric chargers 32B, 32C, 32D, toner cartridges 33B, 33C, 33D, cleaning cases 31B, 31C, 31D are disposed around the photoconductive drums 30B, 30C, 30D, respectively.

The electric chargers 32B, 32C, 32D with the same structure as that of the electric charger 32A are disposed to electrically charge the surfaces of the photoconductive drums 30B, 30C, 30D with a predetermined voltage, respectively.

The toner cartridges 33B, 33C, 33D include cartridge bodies containing toners of cyan, magenta, yellow image components and develop rollers charged with a voltage of reverse polarity of that of the photoconductive drums 30B, 30C, 30D, and the like, respectively. The toner cartridges 33B, 33C, 33D supply the toners in the cartridge bodies to the surfaces of the photoconductive drums 30B, 30C, 30D via the develop rollers, respectively.

The structure and function of the cleaning cases 31B, 31C, 31D are the same as those of the cleaning case 31A.

Hereinafter, a unit of the photoconductive drum 30A, the electric charger 32A, the toner cartridge 33A, and the cleaning case 31A is to be referred to as the first image formation station; likewise, a unit of the photoconductive drum 30B, the electric charger 32B, the toner cartridge 33B, and the cleaning case 31B as the second image formation station, a unit of the photoconductive drum 30C, the electric charger 32C, the toner cartridge 33C, and the cleaning case 31C as the third image formation station, and a unit of the photoconductive drum 30D, the electric charger 32D, the toner cartridge 33D, and the cleaning case 31D as the fourth image formation station.

The transfer belt 40 is a free end ring-like member and rolls over driven rollers 40a, 40c placed under the photoconductive drums 30A, 30D, respectively, and rolls over a drive roller 40B which is placed at a slightly lower position than the driven rollers 40a, 40c. The upper end surface of the transfer belt 40 is in contact with the lower end surfaces of the photoconductive drums 30A, 30B, 30C, 30D. The transfer belt 40 is rotated counterclockwise (as indicated by the black arrows in FIG. 1) by counterclockwise rotation of the drive roller 40b. A transfer charger (transfer unit) 48 is applied with a voltage of a reverse polarity of that of the electric chargers 32A, 32B, 32C, 32D and is placed close to one end of the transfer belt 40 in the X-axis direction (right side in FIG. 1).

The paper feed tray 60 of a substantially rectangular solid shape is placed under the transfer belt 40 and contains piled-up paper sheets 61 for printing. The paper feed tray 60 has a feeder outlet of a rectangular shape close to one end of the upper surface thereof in the X-axis direction (right side in FIG. 1).

The paper feed roller 54 extracts paper sheets 61 one by one from the paper feed tray 60 to feed them to a gap formed between the transfer belt 40 and the transfer charger 48 via the first resist roller 56 composed of a pair of rotary rollers.

The fuse roller 50 is composed of a pair of rotary rollers, and applies heat and pressure to the paper sheets 61 to feed the paper sheets 61 to the discharge roller 58 via the resist roller 52 composed of a pair of rotary rollers. The discharge roller 58 is composed of a pair of rotary rollers and discharges the paper sheets 61 to the discharge tray 501a.

Figure 2:
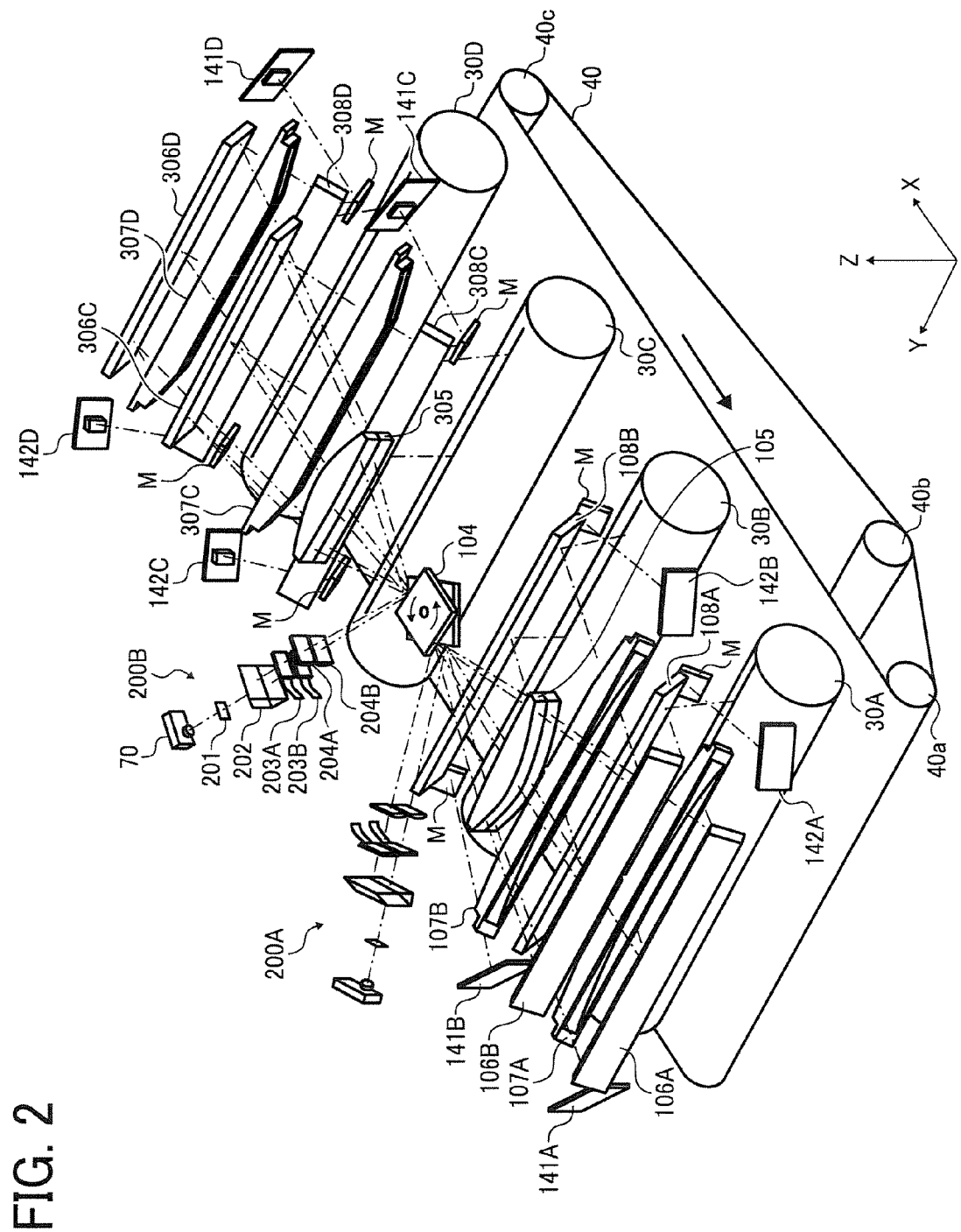
FIG. 2 is a perspective view of an optical scan apparatus 100 according to the first embodiment of the present invention.
Figure 3:
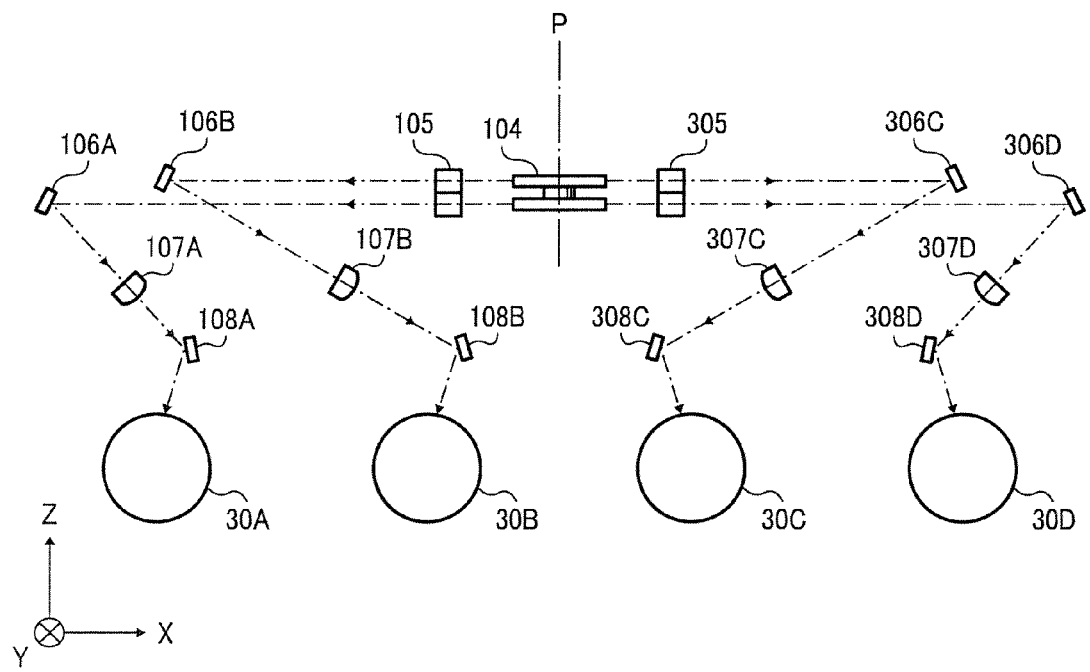
FIG. 3 is a side view of the optical scan apparatus 100.

Next, with reference to FIGS. 2 and 3, the structure of the optical scan apparatus 100 will be described. FIG. 2 is a perspective view of the optical scan apparatus 100 and FIG. 3 is a side view thereof.

The optical scan apparatus 100 comprises an optical imaging system and two optical incidence systems 200A, 200B. The optical imaging system is composed of a polygon mirror 104, an fθ lens 105, reflective mirrors 106B, 106A disposed in sequence in the reverse X-axis direction of the polygon mirror 104, a reflective mirror 108B disposed under the fθ lens 105, a toroidal lens 107B disposed between the reflective mirrors 106B and 108B, a reflective mirror 108A disposed in the reverse X-axis direction of the reflective mirror 106B, and a toroidal lens 107A disposed between the reflective mirrors 106A and 108A, as well as an fθ lens 305 and reflective mirrors 306C, 306D disposed in sequence in the X-axis direction of the polygon mirror 104, a reflective mirror 308C disposed under the fθ lens 305, a toroidal lens 307C disposed between the reflective mirrors 306C and 308C, a reflective mirror 308D disposed in the X-axis direction of the reflective mirror 308C, and a toroidal lens 307D disposed between the reflective mirrors 306D and 308D.

The optical incidence system 200A allows light beams for scanning the photoconductive drums 30A, 30B to be incident on the polygon mirror 104, while the optical incidence system 200B allows light beams for scanning the photoconductive drums 30C, 30D to be incident on the polygon mirror 104.

The optical incidence systems 200A, 200B are optical systems to make light beams to be incident on the deflection surface of the polygon mirror 104 from a direction which makes an angle of 120 or 60 degrees relative to the X axis. As representatively shown in FIG. 2, the optical incidence system 200B includes a light source unit 70, and an aperture member 201, a beam splitter prism 202, a pair of liquid crystal elements 203A, 203B, and a pair of cylindrical lenses 204A, 204B which are disposed in sequence along the path for the light beam from the light source unit 70. For the sake of simplicity, xyz coordinate system is defined here by rotating XY coordinates by 30 degrees around the Z axis in FIG. 2

Figure 4:
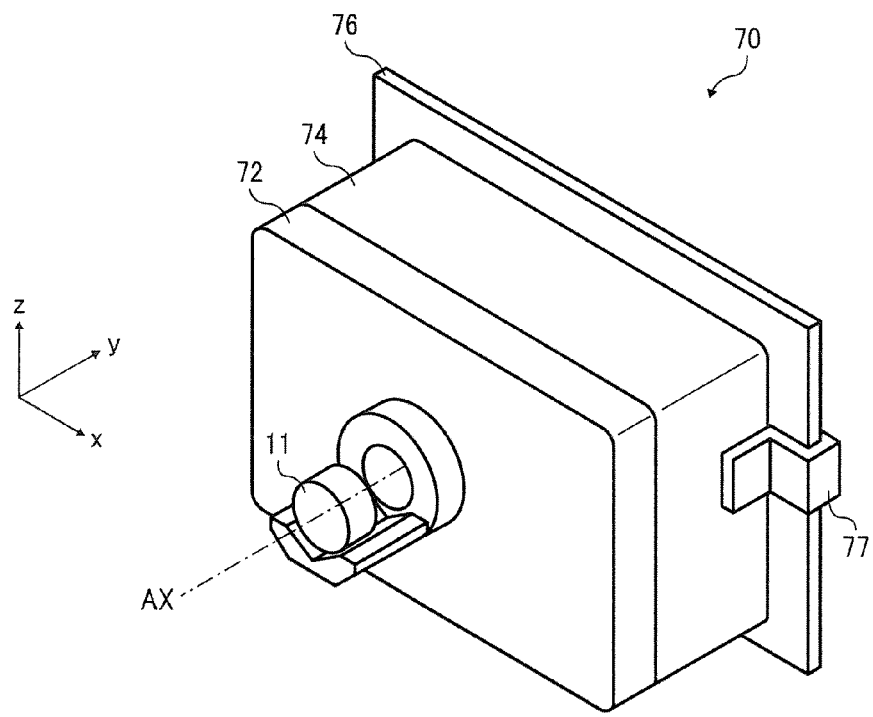
FIG. 4 is a perspective view of a light source unit 70 according to the first embodiment of the present invention.

FIG. 4 is a perspective view of the light source unit 70 which comprises a substrate 76, a first support portion 74, a second support portion 72 supporting a coupling element 11, and a holding member to maintain a positional relation between the substrate and the first support portion.

Figure 5:
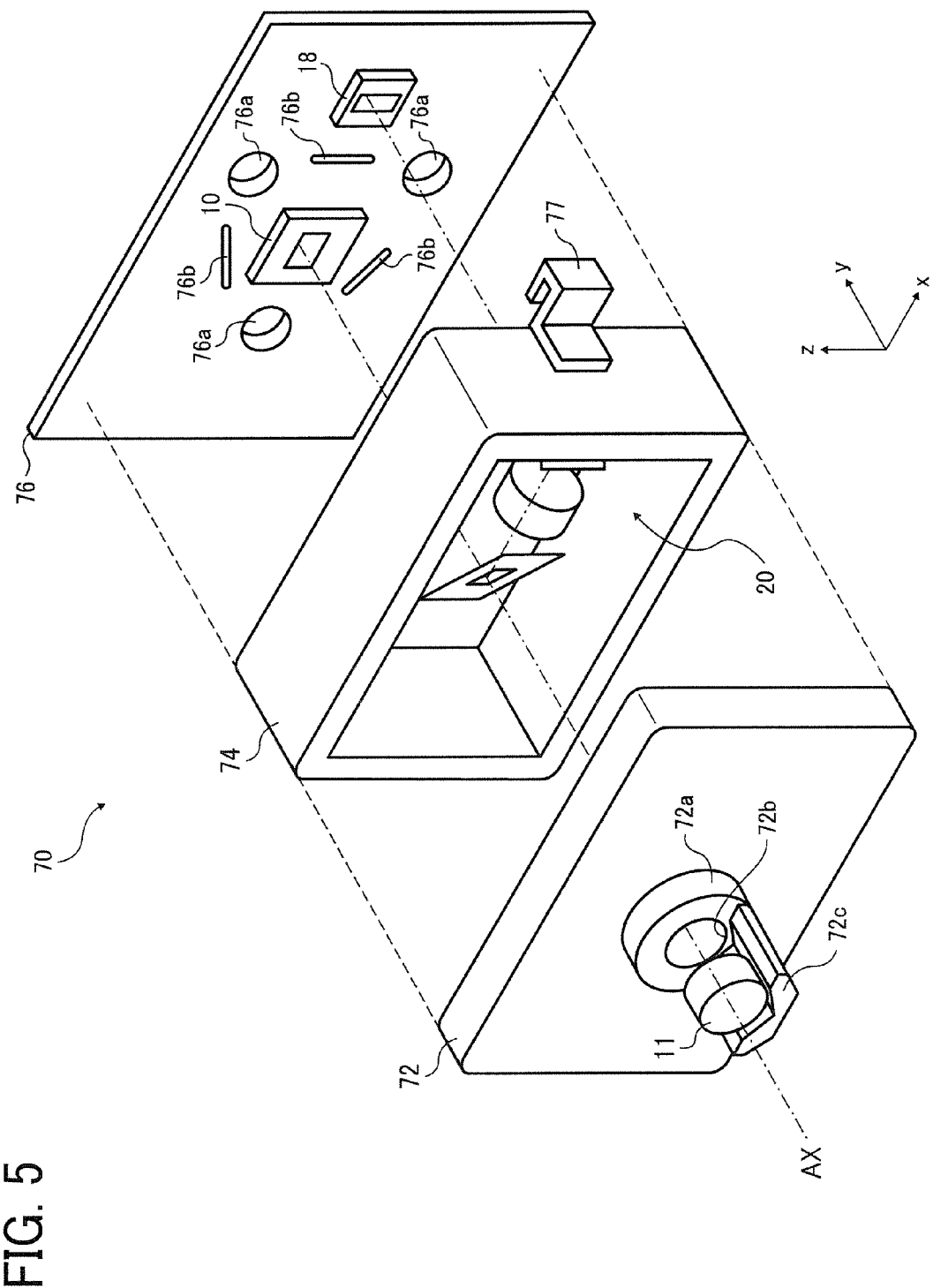
FIG. 5 is a first development view of the light source unit 70.
Figure 6:
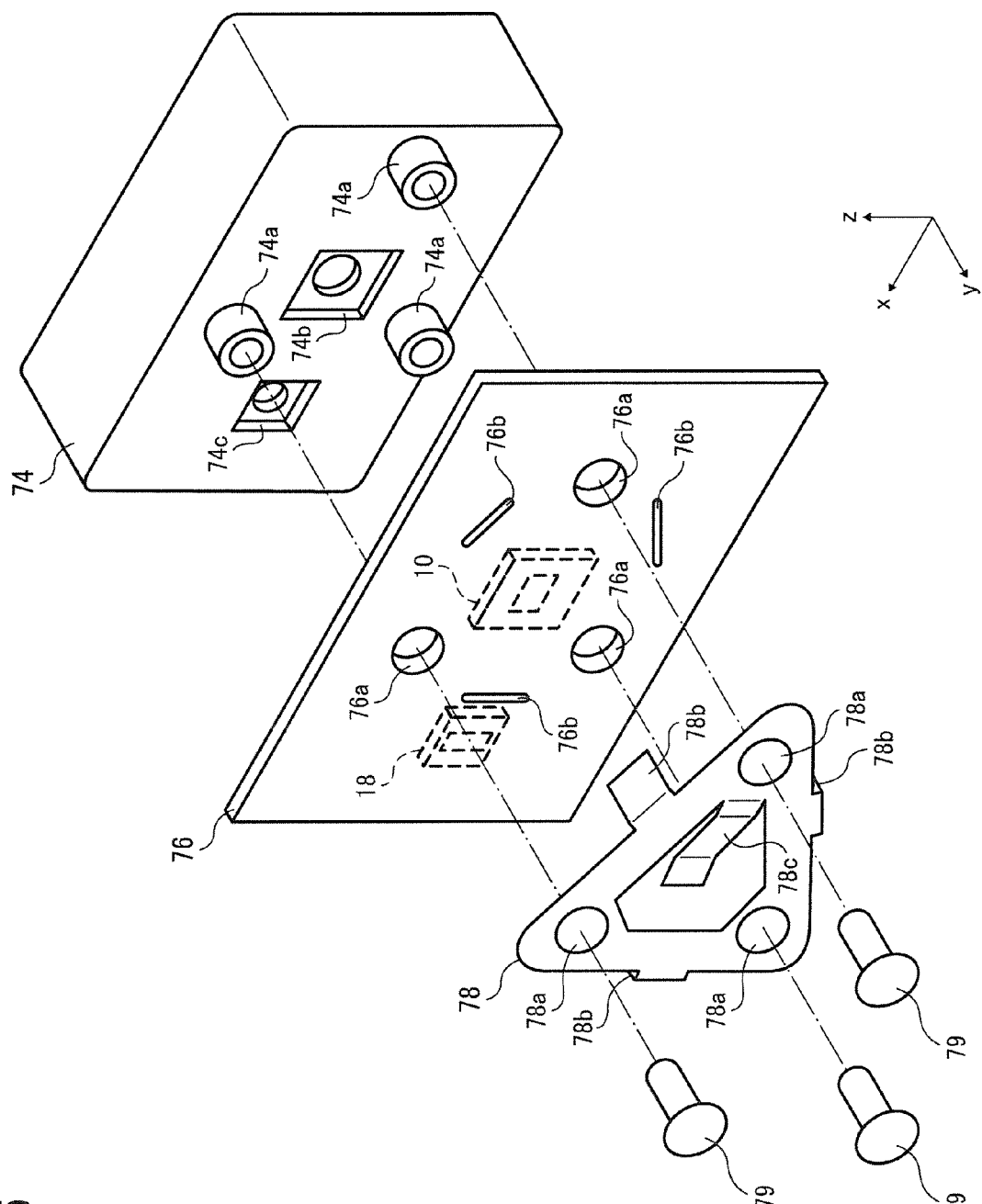
FIG. 6 is a second development view of the light source unit 70.

FIGS. 5, 6 are perspective development views of the light source unit 70. As shown in the drawings, a longitudinal direction of the substrate 76 is the x-axis direction, and it has a light source 10 and a light-receiving element 18 on a surface in the reverse y-axis direction, and a drive circuit driving the light source 10 and a monitor circuit monitoring signals from the light receiving element 18 on the opposite surface, for example. Also, three round holes 76a and three slits 76b are formed on the substrate 76 to surround the light source 10.

Figure 7A:
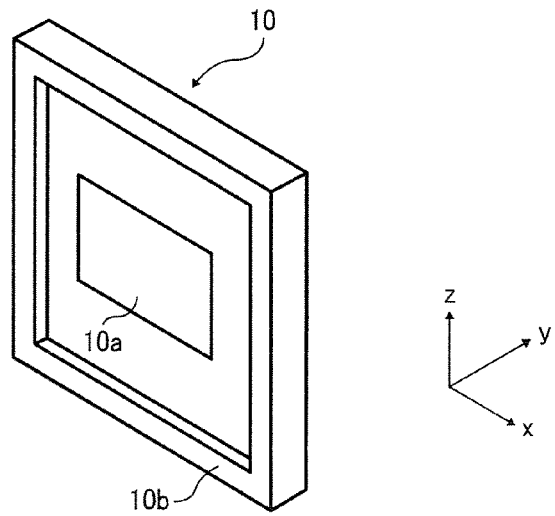
FIG. 7A is a perspective view of a light source 10.

FIG. 7A is a perspective view of the light source 10 which is a vertical cavity surface emitting laser (VCSEL) array including a package 10b of a square plate and a light emitting element 10a contained in the package 10b.

The package 10b is made of a ceramic material, for example, and includes a frame with xy and zy cross sections in U-form and a glass plate in size equivalent to that of the frame and attached to a reverse y-axis side surface thereof. It is filled with inert gas inside.

Figure 7B:
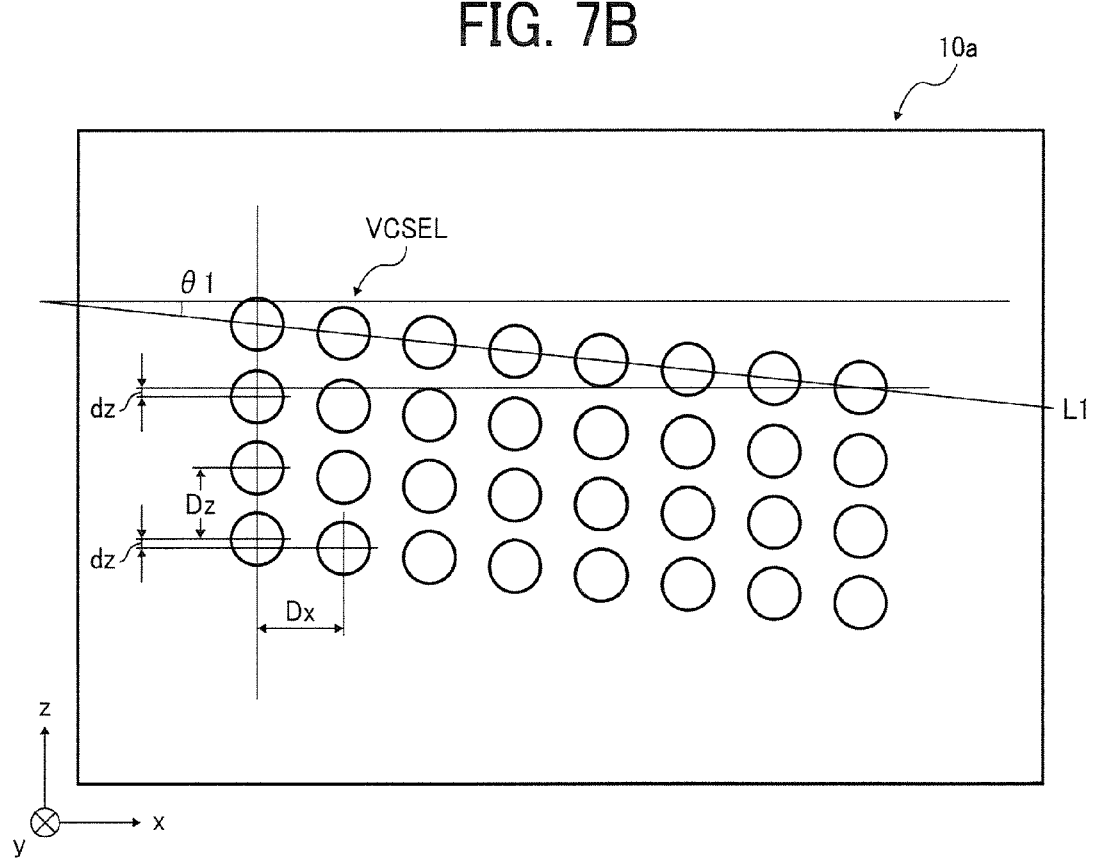
Figure 32:
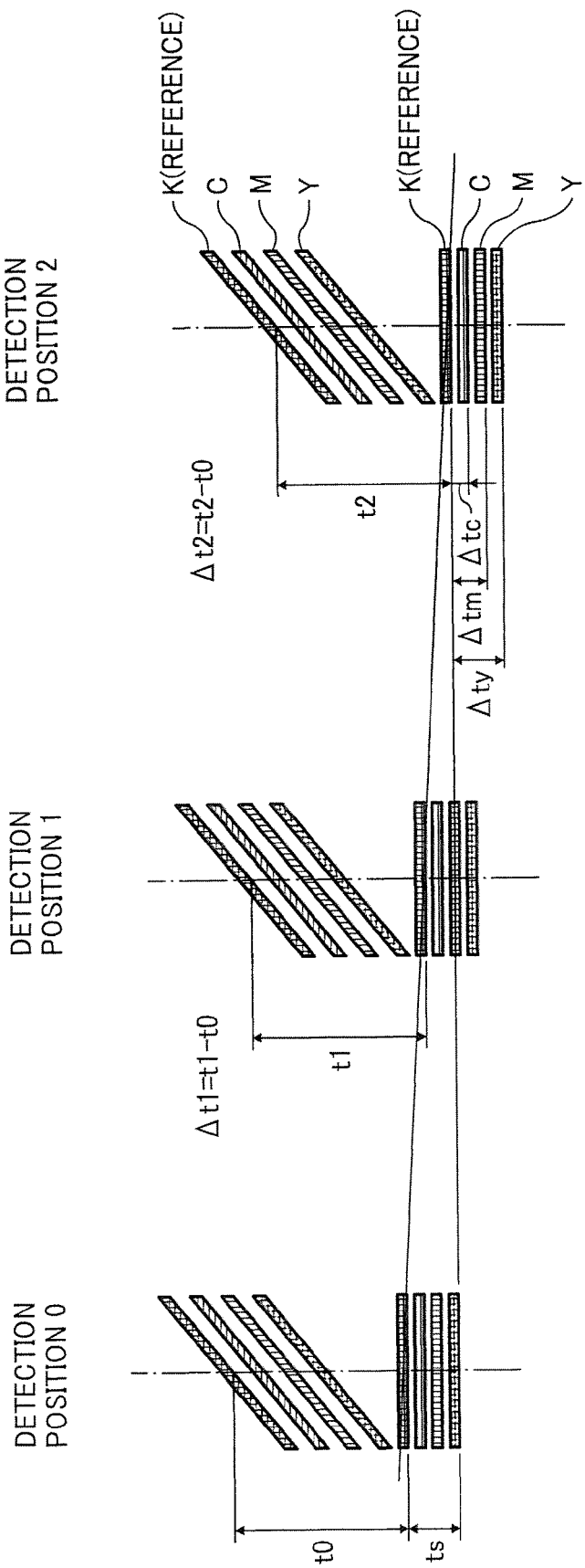
FIG. 32 shows an exemplary detection pattern for shifts of focus positions of beam spots.

The light emitting element 10a includes a light emission plane on which a plurality of VCSELs (light emission portions) are two-dimensionally arranged. As shown in FIG. 7B, 32 VCSELs are arranged in matrix in 4 rows, 8 columns thereon (on the reverse y-axis side) to emit diffusion light in the reserve y direction. The row direction is parallel to a straight line L1 which makes an angle θ1 with the x axis while the column direction is parallel to the z axis. In the present embodiment, an interval Dz between the VCSELs in the sub scan direction is set to 18.4 μm and that Dx in the main scan direction is set to 30 μm, for example. Adjacent VCSELs in the z-axis (sub scan) direction are disposed with an interval dz of 2.3 μm (=Dz/8). The light emitting element 10a is contained in the package 10b such that the light emission plane is parallel to the surface of the package 10b on the reverse y side.

The light receiving element 18 in FIGS. 5, 6 is placed on the x-axis side of the light source 10 to output signals (photoelectric conversion signals) according to intensity of incident light beams. It is used for intensity detection of light beams from the light source 10.

The first support portion 74 is a box-like member with an open surface on the reverse y-axis side and accommodates an optical guide system 20 (FIG. 5). On a surface on the opposite side formed are rectangular concavities 74b, 74c to be fitted with the light source 10 and the light receiving element 18, as well as three cylindrical portions 74a around the concavity 74b to insert through the three round holes 76a, respectively. Also, a circular opening is formed on the bottom walls of the concavities 74b, 74c to be in communication with the first support portion 74.

As shown in FIG. 6, the substrate 76 and the first support portion 74 are joined with each other by fitting the light source 10 and light receiving element 18 into the concavities 74b, 74c and inserting the cylindrical portions 74a through the round holes 76a. The relative position therebetween is defined by mounting a substantially triangular bias member 78 on the cylindrical portions 74a of the first support portion 74.

Figure 8:
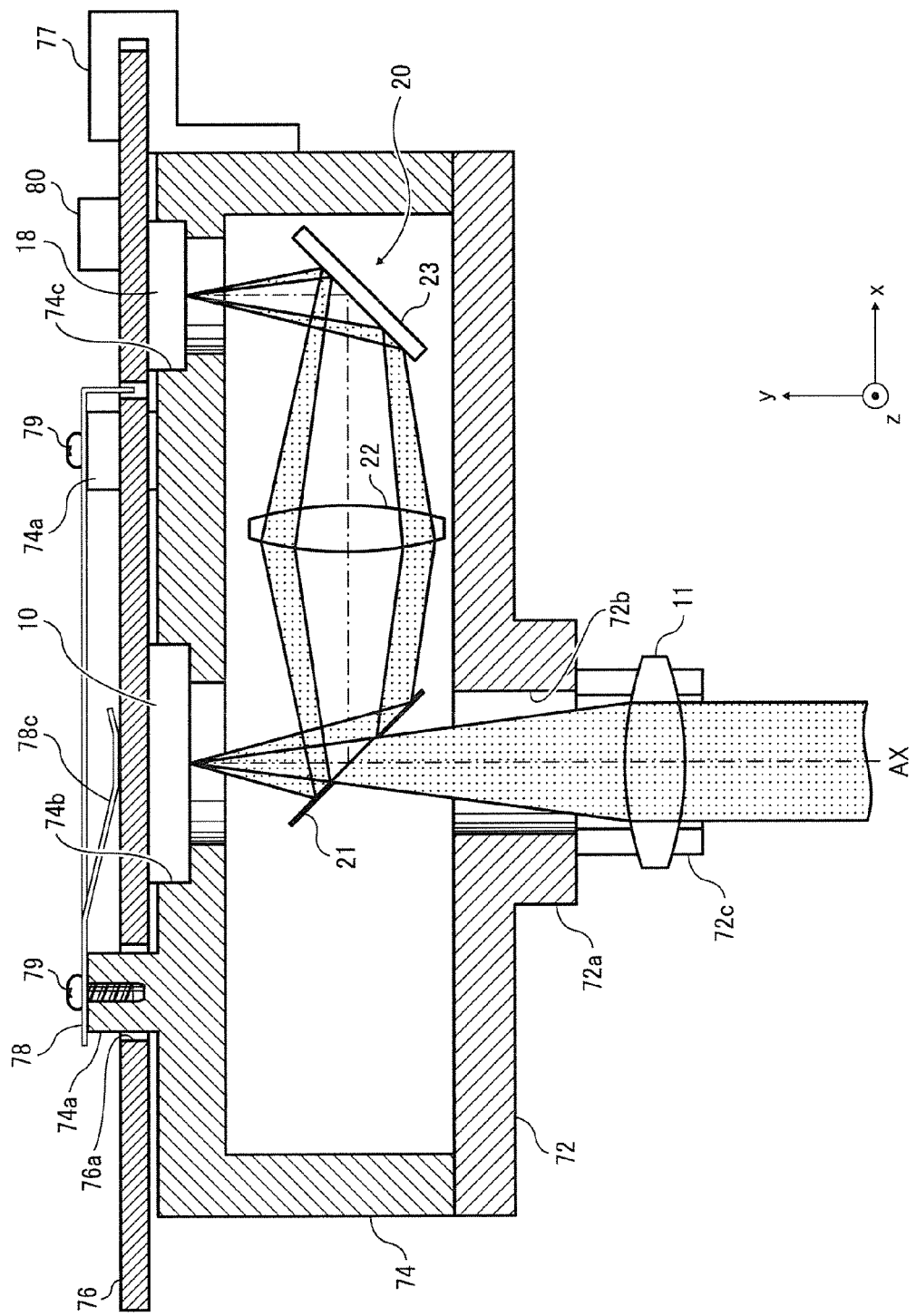
FIG. 8 is an x to y cross sectional view of the light source unit 70 in directions.

The bias member 78 is formed by sheet metal processing on an elastic plate member and provided with three anchor portions 78b and a blade spring 78c, for example. The anchor portions 78b are insertable through three slits 76b on the substrate 76. The blade spring 78c has elastic force acting in the reverse y-axis direction. The bias member 78 is fixed on the first support portion 74 by screws 79. The screws 79 are screwed into the cylindrical portions 74a of the first support portion 74 via the round holes 78a formed at the corners of the bias member 78, respectively while the anchor portions 78b are inserted into the slits 76b of the substrate 76. In such a manner, the blade spring 78c of the bias member 78 biases the substrate 76 in a direction to approach the first support portion 74, and the reverse y-axis side surfaces of the light source 10 and the light receiving element 18 are brought into contact with the bottom walls of the concavities 74b, 74c of the first support portion 74 by pressure, as shown in FIG. 8.

The holding member 77, as shown in FIGS. 4, 5, is composed of a plate-like fixation portion fixed on the x-axis side of the first support portion 74 and a U-form gripper on the y-axis side of the fixation portion. The holding member 77 functions to maintain the defined relative positions between the substrate 76 and the first support portion 74 constantly by fixing the fixation portion on the first support portion 74 while gripping the substrate 76 with the gripper.

The second support portion 72 includes a plate-like body with a circular opening 72b at the center, a ring-like convexity 72a on the reverse y-axis side of the body to surround the circular opening 72b, and a lens support portion 72c extending from a lower part of the convexity 72a to the y-axis reverse direction. The lens support portion 72c has a groove with a V-form cross section on the top surface along the y axis to retain the coupling element 11 at a predetermined position in the x and z axis directions.

The coupling element 11 has a lens with a refractive index of about 1.5 to couple light beams from the light source 10.

The surface of thus-configured second support portion 72 on the y-axis side is fixed at the end of the reverse y-axis side of the first support portion 74 by screws or the like, for example.

The optical guide system 20 as shown in FIG. 8 comprises a beam splitter 21, a collective lens 22, and a reflective mirror 23 which are contained in the first support portion 74.

The beam splitter 21 is a plate-like member with a rectangular opening at the center and has a reflective surface reflecting light beams from the light source 10. The beam splitter 21 is retained to be inclined at 45 degrees relative to the y axis, to thereby have pass through the opening a part of a light beam incident from the y-axis side and reflect the rest of the light beam in the x-axis direction.

The collective lens 22 has a positive power and collects the light beam reflected in the x-axis direction by the beam splitter 21 on the light receiving surface of the light receiving element 18 via the reflective mirror 23.

Figure 9:
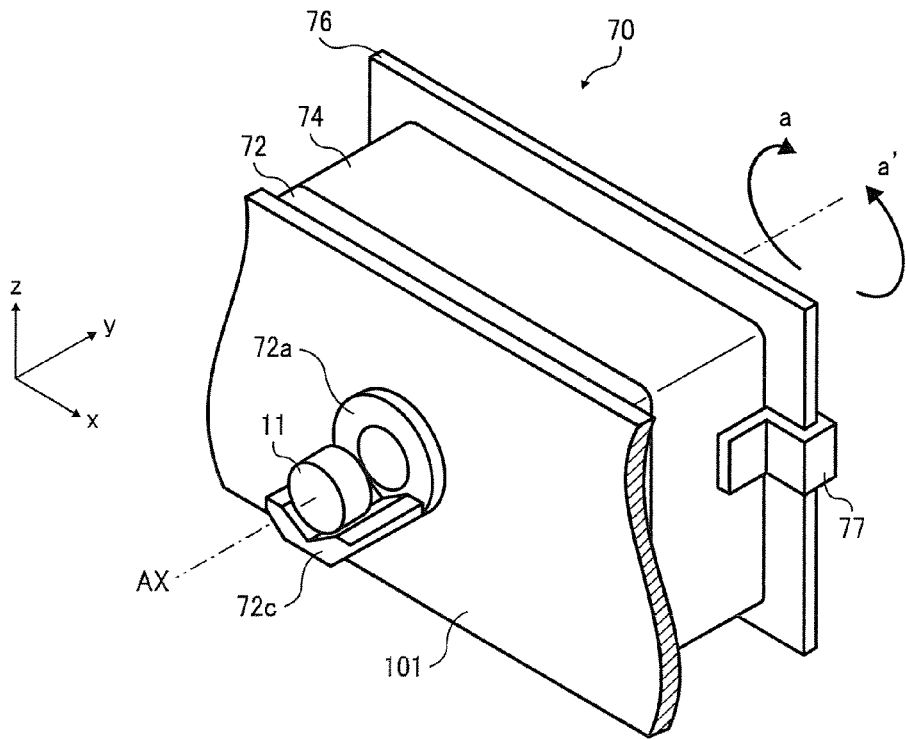
FIG. 9 shows how the light source unit 70 is mounted.

The light source unit 70 is, for example, configured to be rotatably supported around the optical axis of the coupling element 11 by fitting the convexity 72a of the second support portion 72 into the opening of a support member 101 of an optical housing or the like, as shown in FIG. 9. Accordingly, rotating the light source unit 70 relative to the optical elements after the aperture member 201 makes it possible to adjust the light beams to be collected on the photoconductive drums with a predetermined pitch in the sub scan direction. Also, the light source unit 70 is configured to be supplied with electric power from an external power supply via the connector 80 which is provided near the x-axis end of the y-axis side surface of the substrate 76.

Referring back to FIG. 2, the aperture member 201 has a rectangular opening whose longitudinal direction is the x-axis (main scan) direction and is disposed so that the center of the opening is positioned at or around the focus position of the coupling element 11 (FIG. 4) of the light source unit 70, for example.

The beam splitter prism 202 vertically (sub scan direction) splits a light beam having passed through the opening 21a of the beam splitter 21 into two light beams separated with a predetermined distance.

The liquid crystal elements 203A, 203B are vertically adjacent to each other to correspond with the two split light beams and deflect the light beams in the sub scan direction according to a voltage signal supplied from a not-shown controller.

The cylindrical lenses 204A, 204B are vertically adjacent to each other to correspond with the two split light beams and collect the incident light beams on the polygon mirror 104. The cylindrical lenses 204A, 204B have positive curvature at least in the sub scan direction, and function together with later-described toroidal lenses 107A to 107D as an optical face tangle error correction system which make deflection points on the deflection surface of the polygon mirror 104 conjugated with the photoconductive drums 30A to 30D in the sub scan direction.

The polygon mirror 104 is a pair of square prism members having deflection surfaces on side faces, and the two members are vertically adjacent to each other and shifted in phase from each other at 45 degrees. It is rotated at a certain angular velocity by a not-shown rotary mechanism in a direction of arrows in FIG. 2. The light beams are vertically split into two by the beam splitter prism 202 of the optical incidence system 200A or 200B and collected and deflected on the upper and lower deflection surfaces of the polygon mirror 104 respectively, thereby making the light beams incident alternatively on the photoconductive drums.

The fθ lenses 105, 305 each have image height in proportion with the incidence angle of the light beam and move, at a constant velocity relative to the Y-axis, an image plane of the light beam deflected at the certain angular velocity by the polygon mirror 104.

The reflective mirrors 106A, 106B, 306C, 306D are placed so that their longitudinal direction is to be the Y-axis direction, to return the light beams having passed through the fθ lenses 106, 305 to be incident on the toroidal lenses 107A, 107B, 307C, 307D.

The toroidal lenses 107A, 107B, 307C, 307D are placed so that their longitudinal direction is to be the Y-axis direction, to focus the returned light beams on the surfaces of photoconductive drums 30A to 30D via the reflective mirrors 108A, 108B, 308C, 308D whose longitudinal direction is the Y-axis direction, respectively.

Optical detectors 141A, 141B are placed near the ends of the beam incidence surfaces (Y-axis side) of the toroidal lenses 107A, 107B while optical detectors 141C, 141D are placed near the ends of the beam incidence surfaces (reverse Y-axis side) of the toroidal lenses 307C, 307D. Similarly, optical detectors 142A, 142B are placed near the ends of the reverse Y-axis side of the toroidal lenses 107A, 107B while optical detectors 142C, 142D are placed near the ends of the Y-axis side of the toroidal lens 307C, 307D. The optical detectors 141A to 141D, 142A to 142D output signals which turn on only while the light beam is incident.

Next, operation of the image formation apparatus 500 incorporating the optical scan apparatus 100 will be described. Upon receiving image information from a higher-level device or the like, a light beam from the light source unit 70 of the optical incidence system 200A passes through the aperture member 201 to be adjusted in beam form and is split vertically into two. The split light beams transmit through the liquid crystal elements 203A, 203B, respectively to be thereby position-corrected in the sub scan direction, and then are collected on the deflection surface of the polygon mirror 104 via the cylindrical lenses 204A, 204B. The light beams deflected by the polygon mirror 104 are incident on the fθ lens 105.

The upper light beam incident on the fθ lens 105 is reflected by the reflective mirror 106B and incident on the toroidal lens 107B. The toroidal lens 107B collects the light beam on the surface of the photoconductive drum 30B via the reflective mirror 108B. Meanwhile, the lower light beam incident on the fθ lens 105 is reflected by the reflective mirror 106A and incident on the toroidal lens 107A. The toroidal lens 107A collects the light beam on the surface of the photoconductive drum 30A via the reflective mirror 108A. With the phase shift at 45 degrees between the upper and lower deflection surfaces as described above, the photoconductive drums 30B, 30A are alternatively scanned with the upper and lower light beams in the reverse Y axis direction according to the output signals from the optical detectors 141A, 141B, 142A, 142B, respectively.

Similarly, a light beam from the light source unit 70 of the optical incidence system 200B passes through the aperture member 201 to be adjusted in beam form and is split vertically into two. The split light beams transmit through the liquid crystal elements 203A, 203B, respectively to be thereby position-corrected in the sub scan direction, and then are collected on the deflection surface of the polygon mirror 104 via the cylindrical lenses 204A, 204B. The light beams deflected by the polygon mirror 104 are incident on the fθ lens 305.

The upper light beam incident on the fθ lens 305 is reflected by the reflective mirror 306C and incident on the toroidal lens 307C. The toroidal lens 307C collects the light beam on the surface of the photoconductive drum 30C via the reflective mirror 308C. Meanwhile, the lower light beam incident on the fθ lens 305 is reflected by the reflective mirror 306D and incident on the toroidal lens 307D. The toroidal lens 307D collects the light beam on the surface of the photoconductive drum 30D via the reflective mirror 308D. With the phase shift at 45 degrees between the upper and lower deflection surfaces as described above, the photoconductive drums 30C, 30D are alternatively scanned with the upper and lower light beams in the Y axis direction according to the output signals from the optical detectors 141C, 141C, 142D, 142D, respectively.

Further, in the light source unit 70 a light beam from the light source 10 is reflected by the reflective surface of the beam splitter 21 and incident on the light receiving element 18 via the collective lens 22 and the reflective mirror 23. In the light source unit 70 signals are outputted when the light beam is incident on the light receiving element 18 and they are constantly monitored to adjust amount of the light beam from the light source 10.

Specifically, after deflected by the polygon mirror 104 but before reaching the scan area of the photoconductive drum, the light beam is received by the light receiving element 18 which outputs a photoelectric conversion signal upon receipt. The light source unit 70 is configured to detect intensity of the light beam from the light source 10 according to the photoelectric conversion signal from the light receiving element 18 and set a value of a current supplied to each VCSEL so that the intensity of the light beam is to be a preset value. Accordingly, having passed through the opening 21a of the beam splitter 21, the light beam at the preset intensity is incident on the scan areas of the photoconductive drums 30A to 30D. The value of current is reset upon completion of scanning the scan areas and set again before the next scanning. Thus, output of each VCSEL is adjusted for every scanning.

The photoconductive layers on the surfaces of the photoconductive drum 30A, 30B, 30C, 30D are charged with the electric chargers 32A, 32B, 32C, 32D at a predetermined voltage, therefore, electric charges are distributed at a fixed density thereon. When the photoconductive drums 30A, 30B, 30C, 30D are scanned with the light beams, portions of the photoconductive layers on which the light beams are gathered become conductive and the electric potential of the portions is substantially zero. Accordingly, by scanning the photoconductive drums 30A, 30B, 30C, 30D rotating in the direction indicated by the arrows in FIG. 1 with the light beams modulated according to the image information, electrostatic latent images defined by distributed charges are formed thereon.

The develop rollers of the toner cartridges 33A, 33B, 33C, 33D in FIG. 1 supply toners to the electrostatic latent images on the surfaces of the photoconductive drums 30A, 30B, 30C, 30D, respectively. At this point, since the develop rollers of the toner cartridges 33A, 33B, 33C, 33D (develop unit) are charged with a voltage of reverse polarity of that of the photoconductive drum 30A, 30B, 30C, 30D, the toners attached to the develop rollers are charged with the same polarity of that of the photoconductive drum 30A, 30B, 30C, 30D. Because of this, the toners are not attached to the portions on which the electric charges are distributed but only attached to the portions scanned with the light beams. Thereby, the electrostatic latent images are visualized as toner images on the surfaces of the photoconductive drum 30A, 30B, 30C, 30D.

As described above, the respective toner images formed by the first to fourth image formation stations according to image information are superimposedly transferred onto the surface of the transfer belt 40. The toner images on the transfer belt 40 are transferred by the transfer charger 48 onto the paper sheets 61 extracted from the paper feed tray 60 and fused by the fuse roller 50. The paper sheets 61 with the images thereon are discharged by the discharge roller 58 and stacked up sequentially in the paper discharge tray 501a.

As described above, the light source unit 70 according to the present embodiment comprises the bias member 78 which biases the substrate 76 towards the first support portion 74 so that the surface of the light source 10, specifically, the surface (reverse y-axis side) of the package 10b (FIG. 7(A)) is brought in contact with the bottom wall of the concavity 74b by pressure. This enables precise positioning of the light source 10 relative to the first support portion 74. Further, after the bias member 78 defines the positional relation between the substrate 76 and the first support portion 74, the holding member 77 is fixed to the first support portion 74 while the gripper is gripping the substrate 76. Thereby, it is possible to constantly maintain the defined relative positions between the substrate 76 and the first support portion 74, resulting in constantly maintaining the positional relation between the coupling element 11 supported by the second support portion and the light source 10.

Moreover, the holding member 77 as shown in FIG. 8 grips the neighborhood of the connector 80 on the substrate 76. This can prevent the relative position between the substrate 76 and the first support portion 74 from being changed due to receiving the impact from attachment/detachment of the wiring from/to the connector 80, or the substrate 76's accidentally getting in contact with other components during maintenance work or the like, for example.

The bias member 78 is configured to have the anchor portions 78b to be inserted through the slits 76b on the substrate 76, when fixed to the first support portion 74. This also makes it possible to prevent the relative position between the substrate 76 and the first support portion 74 from being changed.

Further, the optical scan apparatus 100 according to the present embodiment comprises the light source unit 70 in which the holding member 77 can stably maintain the positional relation between the light source 10 and the coupling element 11. This can avoid varying the imaging characteristics of the light beams on the photoconductive drums 30A to 30D over time, enabling stable, accurate scanning on the photoconductive drums 30A to 30D.

Further, the light source unit 70 is rotatably disposed around the optical axis of the coupling element 11. Accordingly, rotating the light source unit 70 relative to the optical elements after the aperture member 201 makes it possible to adjust the light beams to be collected on the photoconductive drums with a predetermined pitch in the sub scan direction.

Further, the image formation apparatus 500 according to the present embodiment forms images based on the electrostatic latent images formed by the optical scan apparatus 100. Therefore, it can stably form accurate images on the paper sheets 61.

Moreover, in the image formation apparatus 500 according to the present embodiment, the beam splitter 21 is configured to split the light beams from each VCSEL of the light source 10 by having only the light beam including chief ray pass therethrough and reflecting the other light beams. This makes it possible to scan the photoconductive drums 30A to 30D with the light beams with high intensity having passed through the opening 21a, and at the same time use the light beams not contributing to scanning for the intensity monitoring. In this manner, light beam use efficiency can be improved.

Second Embodiment

Figure 10:
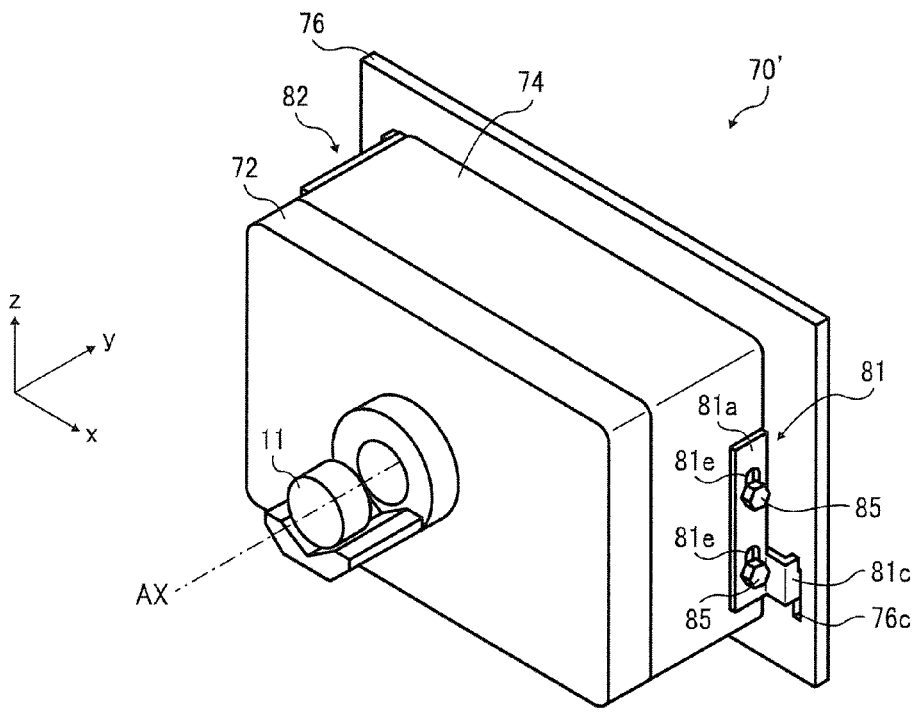
FIG. 10 is a perspective view of a light source unit 70' according to the second embodiment of the present invention.

Next, the second embodiment of the present invention will be described with reference to FIGS. 10 to 14. A description on the same components as those in the first embodiment will be simplified or omitted FIG. 10 shows a light source unit 70' according to the second embodiment. The light source unit 70' is different from the light source unit 70 in that the substrate 76 and the first support portion 74 are joined by use of a pair of holding members 81, 82.

Figure 11A:
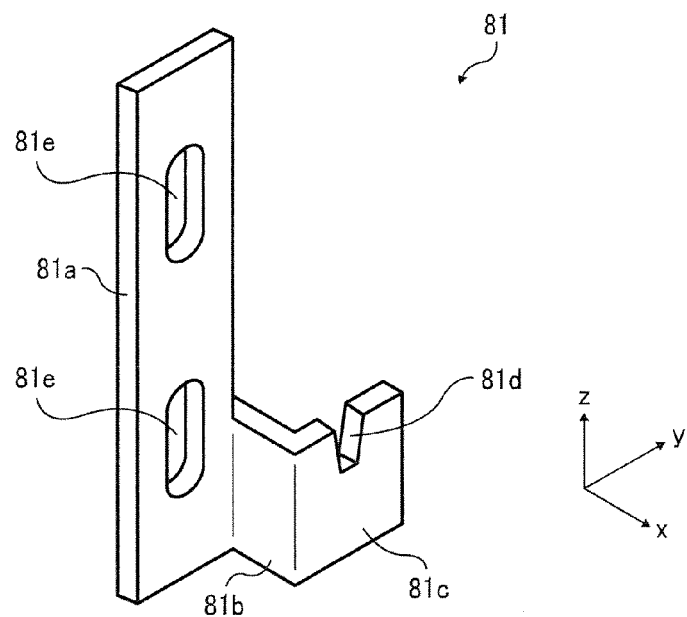
FIG. 11A is a perspective view of a holding member 81.
Figure 11B:
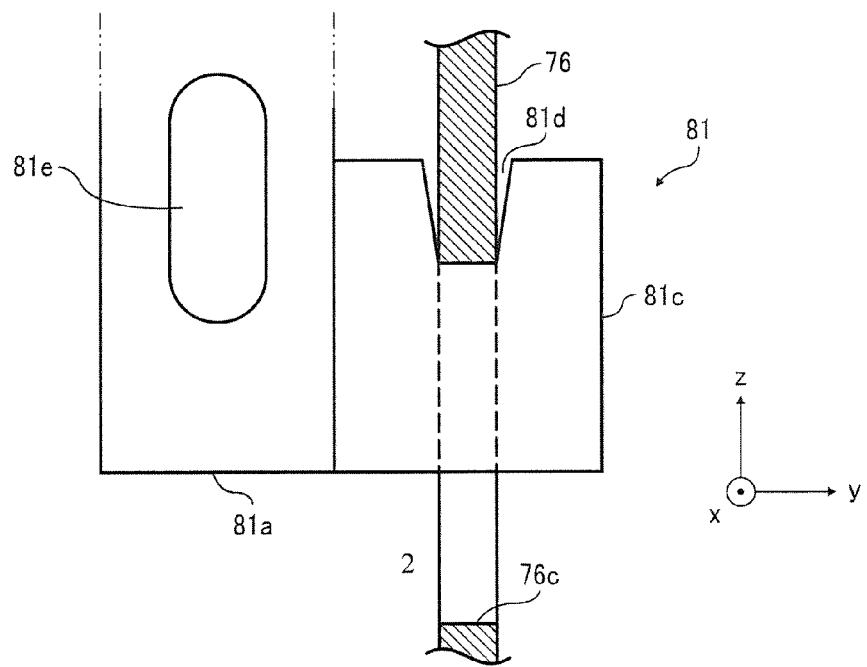
FIG. 11B is a partial side view thereof.

FIG. 11A perspectively shows the holding member 81 while FIG. 11B partially shows a side thereof. The holding member 81 is formed by press working or sheet metal processing on a metal plate. The holding member 81 is composed of three parts, a rectangular fixation portion 81a which is long in the z-axis direction, a plate-like latch portion 81c with a V-form notch (engaging portion) 81d from an upper end to the center, a connection portion 81b to connect the fixation portion 81a and the latch portion 81c when they are in parallel to each other, as shown in FIG. 11A. The fixation portion 81a has long holes 81e adjacent with each other and long in the z-axis direction. As shown in the exploded view in FIG. 11B, the notch 81d of the latch portion 81c is formed in such a shape that the two side lines get narrower in width in the y-axis direction as they go downwards (reverse z-axis direction). The width of the bottom thereof is set to be equal to or smaller than the thickness of the substrate 76.

Figure 12A:
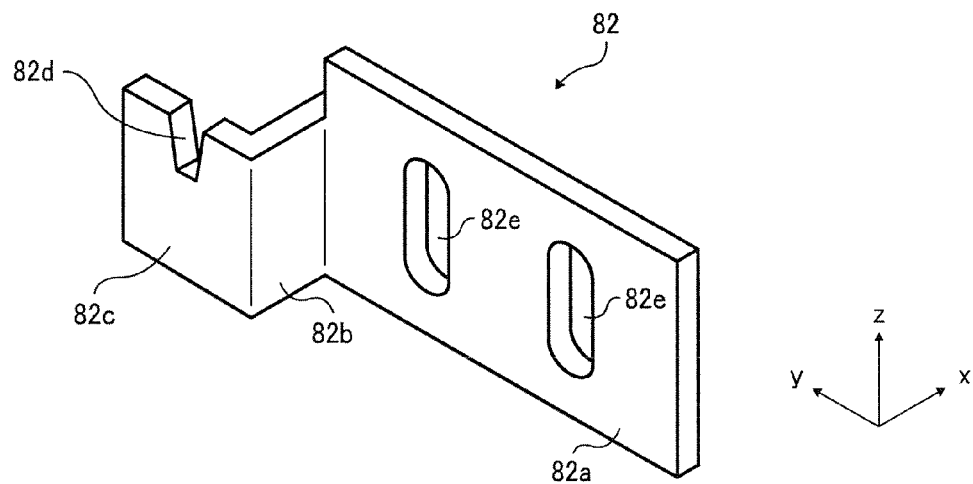
FIG. 12A is a perspective view of a holding member 82.
Figure 12B:
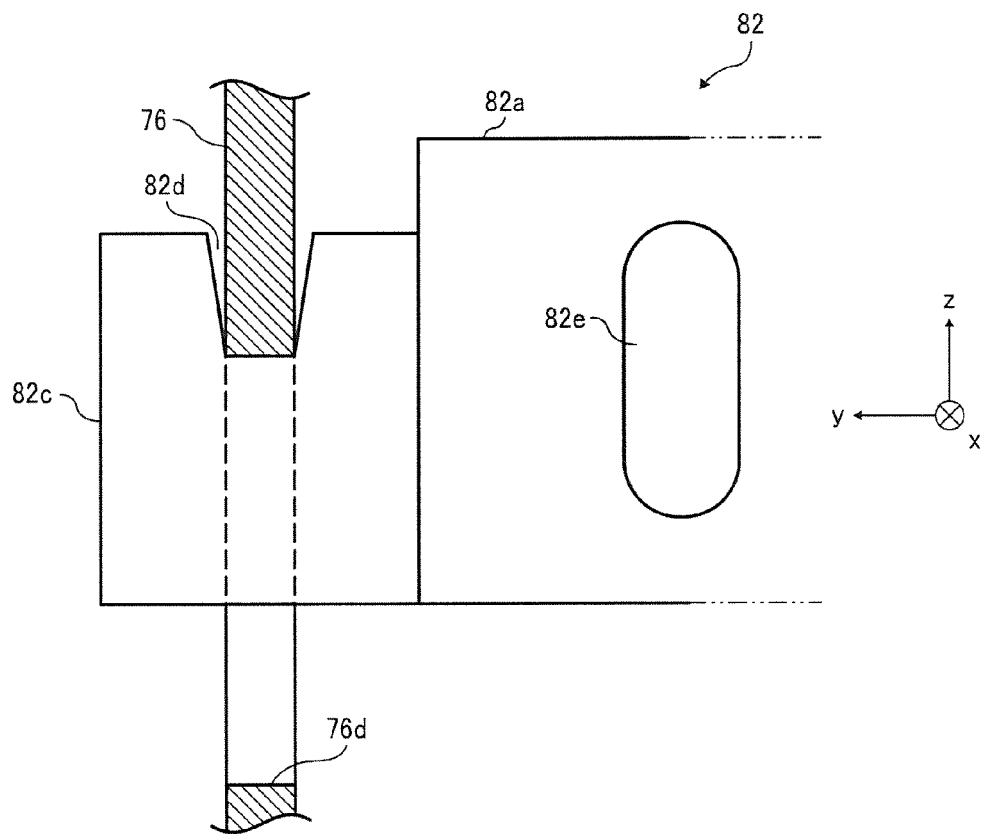
FIG. 12B is a partial side view thereof.

Similarly, FIG. 12A perspectively shows the holding member 82 while FIG. 12B partially shows a side thereof. The holding member 82 is formed by press working or sheet metal processing on a metal plate. The holding member 82 is composed of three parts, a fixation portion 82a which is long in the y-axis direction, a plate-like latch portion 82c with a notch (engaging portion) 82d from an upper end to the center, a connection portion 82b to connect the fixation portion 82a and the latch portion 82c when they are in parallel to each other, as shown in FIG. 12A. The fixation portion 82a has long holes 82e adjacent with each other in the y-axis direction and long in the z-axis direction. As shown in the exploded view in FIG. 12B, the notch 82d of the latch portion 82c is formed in such a shape that the two side lines get narrower in width in the y-axis direction as they go downwards (reverse z-axis direction). The width of the bottom thereof is equal to or smaller than the thickness of the substrate 76.

Figure 13:
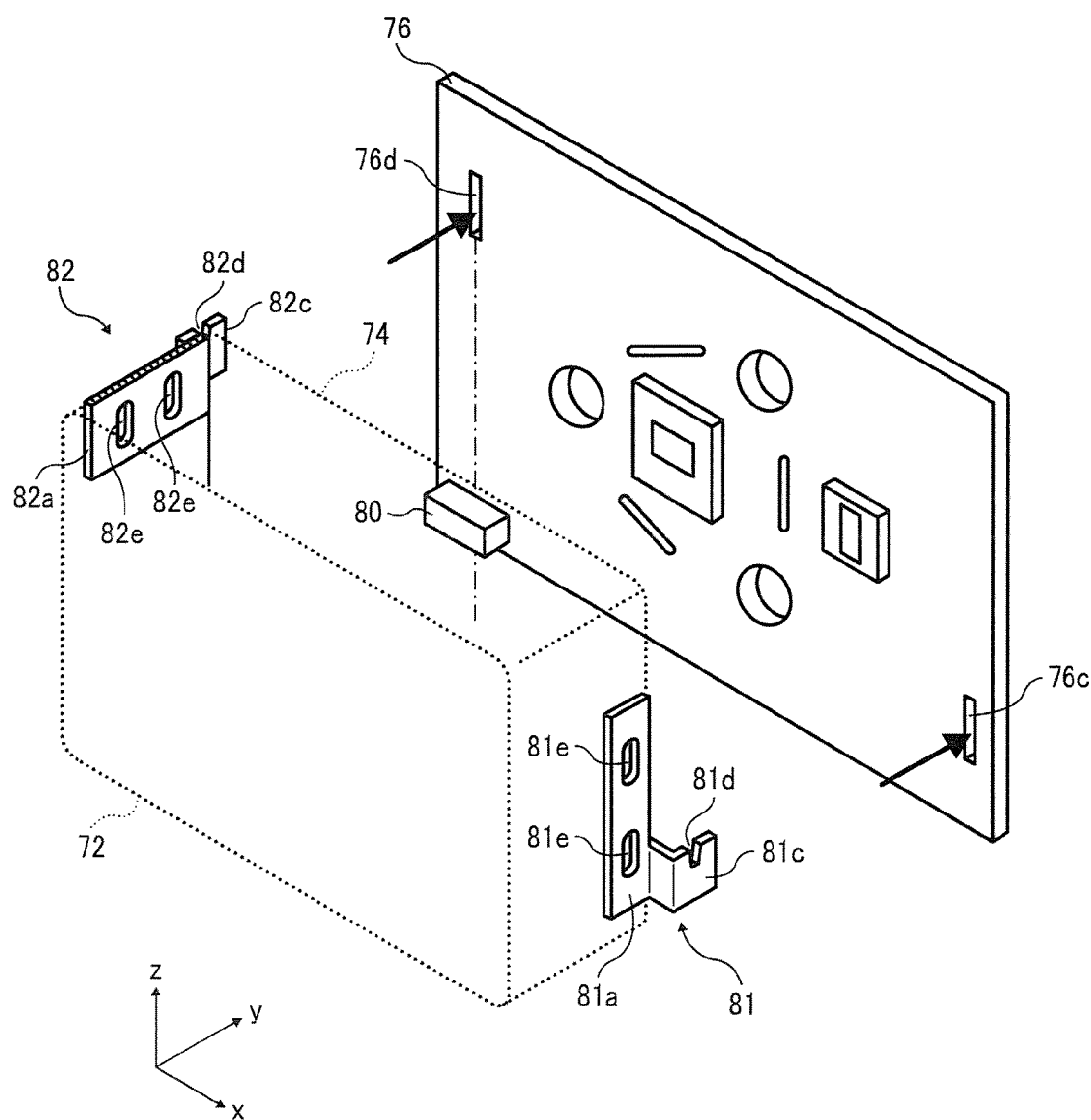
FIG. 13 shows a first example of how a first support portion and a substrate 76 are joined.

Referring to FIGS. 10, 13, such a holding member 81 is fixed on the side surface (x-axis side) of the first support portion 74 with bolts 85 via the long holes 81e of the fixation portion 81a, with the latch portion 81c projected from the x-axis side of the first support portion 74. Likewise, the holding member 82 is fixed on the side surface (reverse x-axis side) of the first support portion 74 with not-shown bolts 85 via the long holes 82e of the fixation portion 82a, with the latch portion 82c projected from the y-axis side of the first support portion 74. The holding members 81, 82 are configured to be vertically movable by the bolts 85's sliding in the long holes 81e, 82e, respectively.

As shown in FIG. 13, the substrate 76 includes, at upper end of the reverse x-axis side and lower end of the x-axis side, holes 76c, 76d which are long in the z-axis direction. The first support portion 74 and the substrate 76 are fixed by fitting the light source 10 and the light receiving element 18 into the concavities 74b, 74c of the first support portion 74 (FIG. 6) and then joining the first support portion 74 and the substrate 76 with the latch portions 81c, 82c of the holding members 81, 82 inserted through the holes 76c, 76d, respectively.

Then, by moving the holding members 81, 82 upwards relative to the substrate 76 and the first support portion 74, as shown in FIGS. 11B, 12B, the notches 81d, 82d of the holding members 81, 82 are engaged with the holes 76c, 76d while the bottom portions of the holding members are in contact with the substrate 76. The holding members 81, 82 are firmly fixed to the first support portion 74 by fastening the bolts 85 fitted into the first support portion 74. In this manner the substrate 76 can be fixed on the first support portion 74 at the defined position in the y-axis direction.

Figure 14:
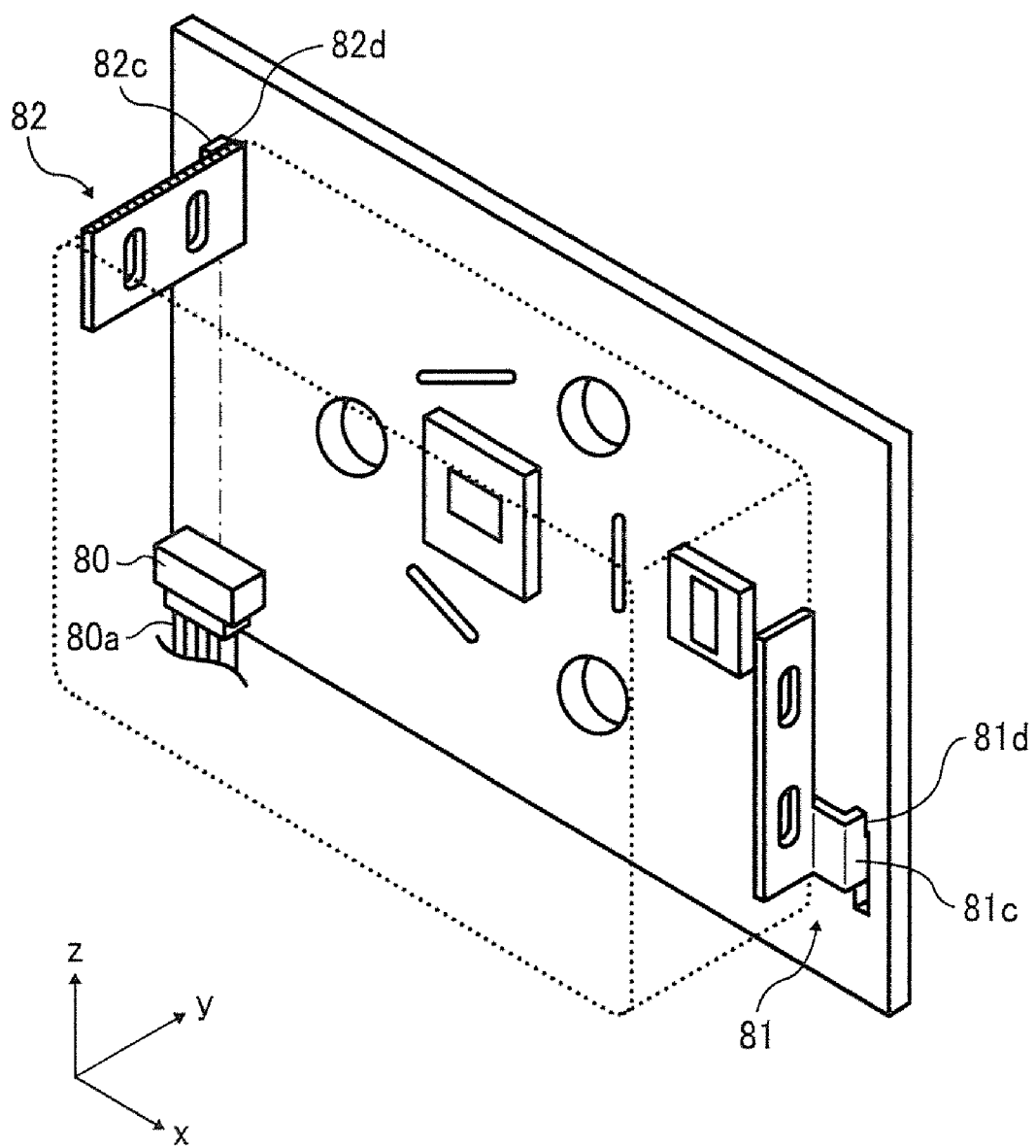
FIG. 14 shows a second example of how the first support portion and the substrate 76 are joined.

Moreover, the light source unit 70' includes a connector 80 on the reverse y-axis side surface of the substrate 76, as shown in FIGS. 13, 14 for example. The connector is placed on a straight line on the hole 76d and in parallel to the z axis, to be connected with an external wiring 80a (FIG. 14) from below.

As described above, the light source unit 70' according to the present embodiment is configured to include the holding members 81, 82 so that the first support portion 74 and the substrate 76 can be fixed at the defined relative position by fixing the fixation portions 81a, 82a on the first support portion 74 while the notches 81d, 82d are engaged with the substrate 76. This allows the relative position between the first support portion 74 and the substrate 76 to be constantly maintained, resulting in constantly maintaining the relative position between the coupling element 11 on the second support portion 72 and the light source 10.

Further, disposing the connector 80 on the straight line on the hole 76d and in parallel with the z axis can effectively reduce a displacement in the positions of the substrate 76 and the first support portion 74 due to external force from connecting/disconnecting (putting in/pulling out) the external wiring 80a to/from the connector 80. In general, detachment of the external wiring 80a is likely to be done carelessly. Aiming for preventing this from happening, the holding members 81, 82 according to the present embodiment are configured to support the substrate 76 from below by the notches 81d, 82d.

In the present embodiment, the notches 81d, 82d are formed in such a shape that the two side lines get narrower in width in the y-axis direction as they go downwards (reverse z-axis direction). The width of the bottom thereof is set to be equal to or smaller than the thickness of the substrate 76. This can especially achieve more precise positioning of the substrate 76 in the y-axis direction. However, without assembling easiness taken into consideration, the notch 81d can be shaped such that the width of the two side lines in the y-axis direction is equal to the thickness of the substrate 76 at any point. Further, the width thereof in the y-axis direction need not be equal to or smaller than the thickness of the substrate in order to avoid the positional shift of the first support portion 74 and the substrate 76 due to external force from the z-axis direction alone.

When the external wiring is attached/detached to/from the connector 80 on the substrate 76 in the y-axis direction, the connector 80 is preferably disposed close to the holding members. For the attachment/detachment in the other directions, optimally adjusting the position and direction of the holding members makes it possible to constantly maintain the relative position of the first support portion 74 and the substrate 76.

According to the present embodiment, the respective portions of the holding members 81, 82 are shaped with precision by press working or sheet metal processing. Accordingly, the engaging portions can be engaged with the substrate 76 firmly.

The present embodiment has described an example where the notches 81d, 82d of the holding members 81, 82 are engaged with the holes 76c, 76d. However, the present invention is not limited thereto. The holding members 81, 82 can be configured to be engaged with the outer edge portion of the substrate 76, or notches formed on the outer edge portion.

Also, the present embodiment has described an example where the relative position of the first support portion 74 and the substrate 76 are fixed by the two holding members 81, 82. However, the number of holding members can be three or more, or only one, for example, the holding member 82 only. In this case, it is also possible to reduce moment around the y axis on the substrate 76 due to the external force from the detachment/attachment of the external wiring 80a from/to the connector 80.

In the first embodiment, the holding members are placed at the fixed positions on the first support portion 74 while in the second embodiment, they are movable in the z-axis direction. Alternatively, the holding members may be movable in the y-axis direction relative to the first support portion 74.

Figure 15:
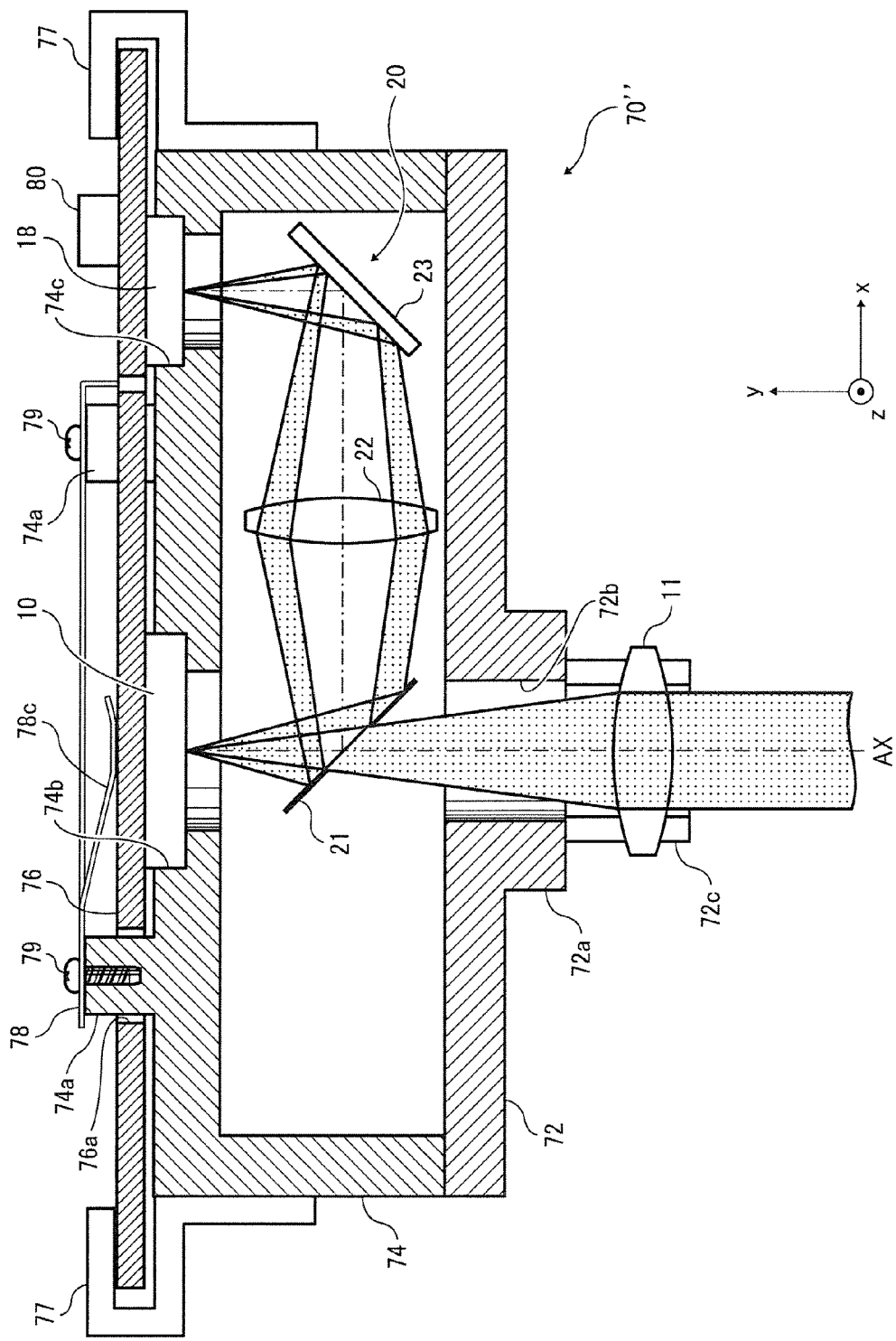
FIG. 15 is a first x to y cross sectional view of a modified example, a light source unit 70"
Figure 16:
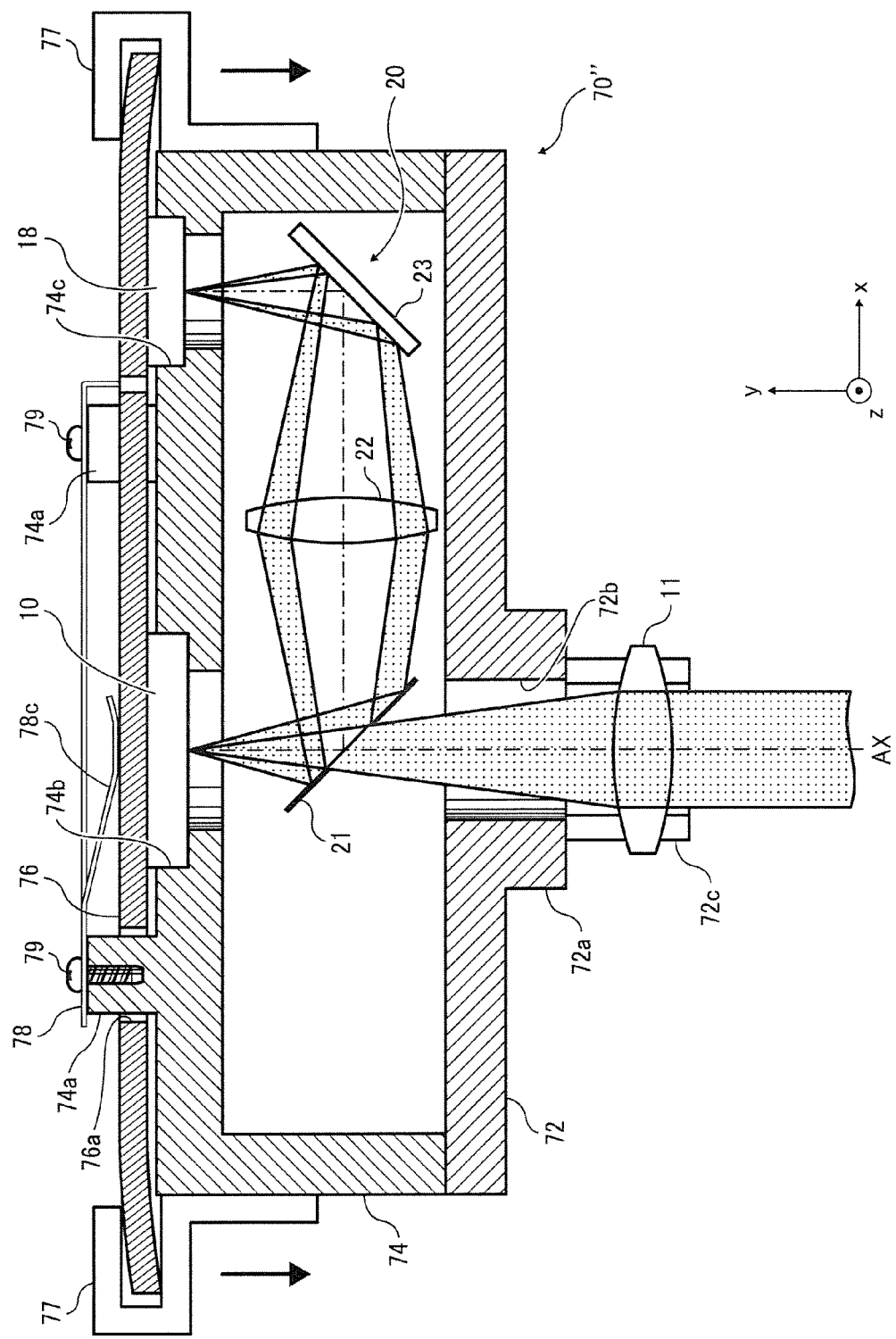
FIG. 16 a second x to y cross sectional view of the light source unit 70"

In such a case, as shown in a light source unit 70" in FIG. 15, the first support portion 74 and the substrate 76 are joined with each other while a pair of holding members 77 are fitted into two outer ends of the substrate 76. Then, in FIG. 16, by relatively moving the holding members to the first support portion 74 in the reverse y-axis direction, the substrate 76 is bent to generate elastic force on the light source 10 in the reverse y-axis direction. This can firmly bring the reverse y-axis side surface of the light source 10 in contact with the bottom wall of the concavity 74b on the first support portion 74 by pressure.

The first and second embodiments have described the multi-color image formation apparatus 500 with the plurality of photoconductive drums 30A to 30D. However, the present invention is not limited thereto. The present invention is applicable to a mono-color image formation apparatus which scans a single photoconductive drum with a plurality of light beams.

Further, the first and second embodiments have described an example where the optical scan apparatus 100 is applied to a printer. However, the present invention is not limited thereto. The optical scan apparatus 100 is suitable for other image formation apparatuses besides a printer, such as a photocopier, a facsimile machine, or the combination of such devices.

Third Embodiment

Figure 17:
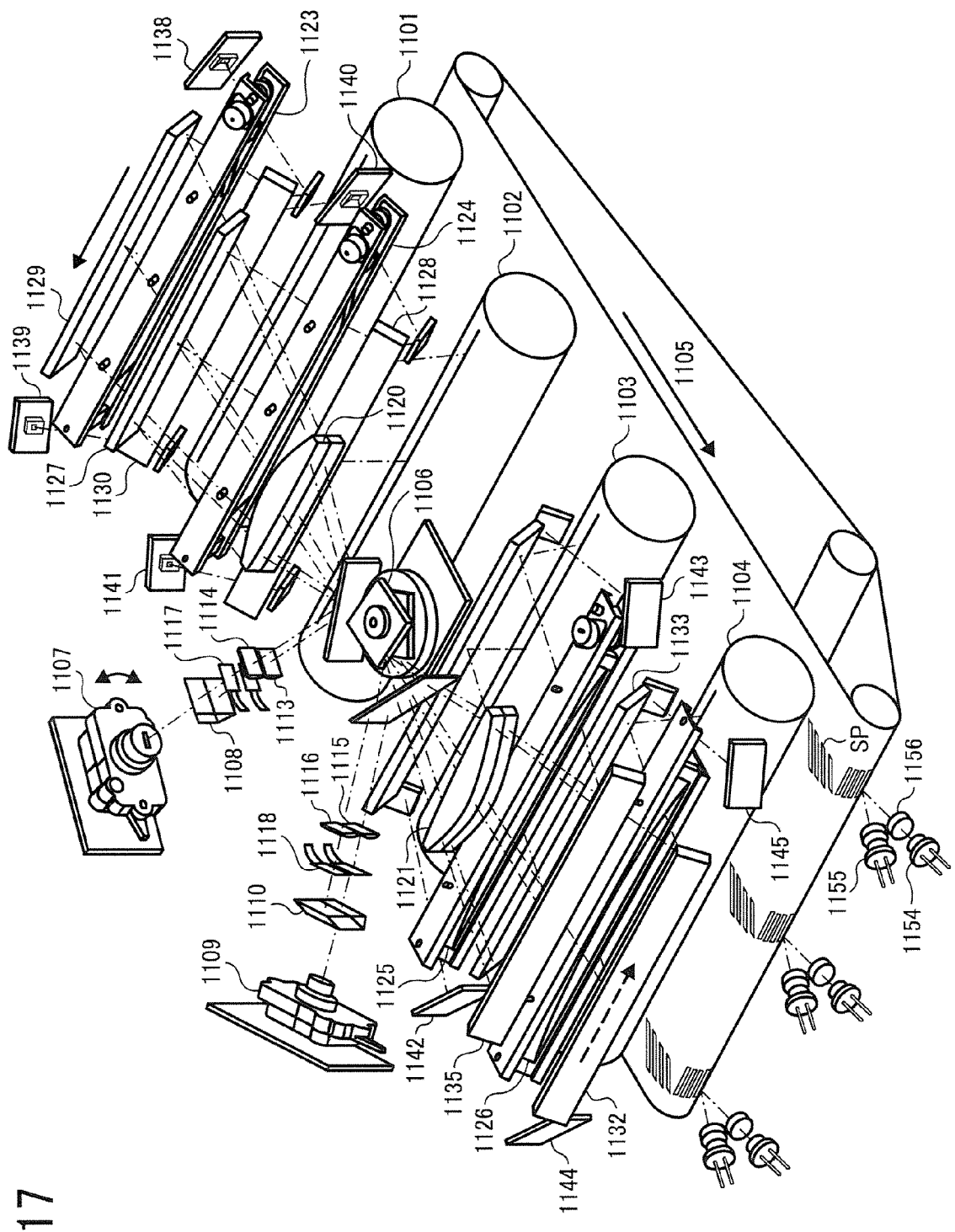
FIG. 17 is an optical scan apparatus according to the third embodiment of the present invention.

FIG. 17 shows an optical scan apparatus scanning four image formation stations according to the present embodiment. FIG. 17 shows photoconductive drums 1101 to 1104, a polygon mirror 1106, light source units 1107, 1109, beam splitter prisms 1108, 1110, cylindrical lenses 1113 to 1116, liquid crystal elements 1117, 1118, and others. The other components will be described later when appropriate.

The optical scan apparatus in FIG. 17 is integrally structured to emit a plurality of light beams from the light source units 1107, 1109, and deflect them by the single polygon mirror 1106 to scan the photoconductive drums 1101 to 1104. The photoconductive drums 1101 to 1104 are disposed with equal interval in a moving direction 1105 of a transfer body. Color images are formed by sequentially transferring and superimposing toner images of four different colors formed on the photoconductive drums 1101 to 1104.

The polygon mirror 1106 is formed in two upper and lower stages to scan the photoconductive drums 1101 to 1104 with the light beams.

The light source units 1107, 1109 are placed for two image formations by light beams scanning in the same direction. The light beams therefrom pass through the beam splitter prisms 1108, 1110 to be vertically split into two and incident on the upper and lower stages of the polygon mirror 1106.

The light source units 1107, 1109 and fθ lenses 1120, 1121 and toroidal lenses 1123 to 1126 constituting an optical imaging system are symmetrically arranged relative to a plane including the rotary axis of the polygon mirror 1106 and parallel with the axes of the photoconductive drums. Thereby, the light beams from the light source units 1107, 1109 are deflected by the polygon mirror 1106 in opposite directions and guided to the photoconductive drums 1101 to 1104.

In the image formation stations, the two photoconductive drums on each side are scanned in opposite directions. The lengths of the scan areas on the respective photoconductive drums, or magnifications in the main scan direction are set to be the same. An electrostatic latent image is formed on each photoconductive drum so that a scan start position on one side coincides with a scan end position on the other side.

Figure 18:
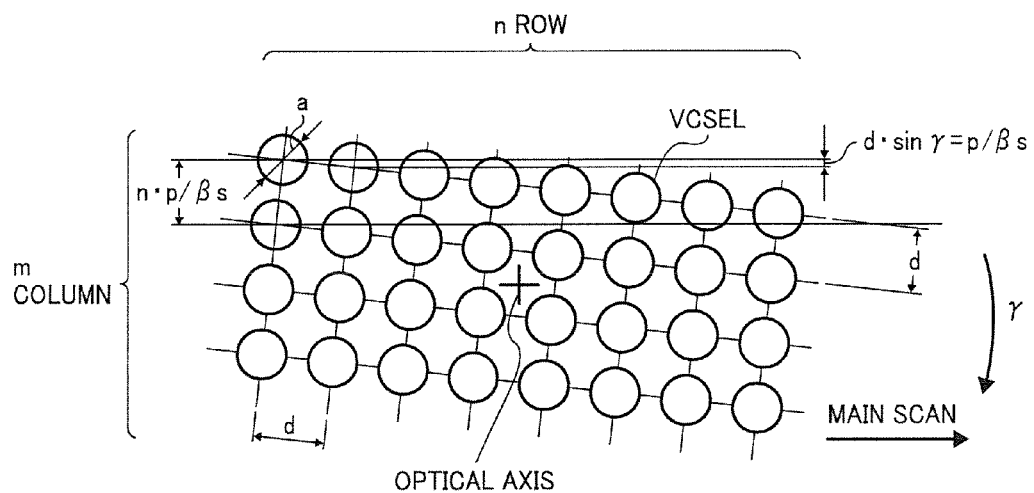
FIG. 18 is a pattern diagram of a light source of the optical scan apparatus according to the third embodiment.

FIG. 18 is a pattern diagram of a vertical cavity surface emitting laser (VCSEL) array. In the drawing, d represents an interval between VCSELs (light emission portions), m represents the number of rows in the main scan direction, n represents the number of columns in the main scan direction, p represents a scan line pitch in the sub scan direction, and γ represents an angle between a direction of arrangement of the VCSELs and the main scan direction.

In the present embodiment the vertical cavity surface emitting laser array is composed of 32 VCSELs in matrix of n columns, m rows two-dimensionally arranged with equal interval (8 columns, 4 rows in the present embodiment). The inclination γ of the laser array is adjusted so that beam spot pitch p in the sub scan direction on the photoconductive drums 1101 to 1104 is to match with scan line pitch equivalent to recording density. Thereby, each image formation station can be scanned with 32 scan lines at the same time.

Here, the inclination γ is expressed by the following expression:

$$\sin \gamma = (\cos \gamma)/n = p/d \cdot \beta s$$

where βs is sub-scan magnification of the entire optical system. The arrangement direction of the VCSELs can be preset to be inclined at a predetermined angle relative to the surface end of the substrate in manufacture process of the laser array. The liquid crystal elements 1117, 1118 have pass therethrough only polarization components suited for the arrangement direction of the liquid crystals. Because of this, the VCSELs are disposed so that their polarization directions are the same.

The liquid crystal elements 1117 are disposed for upper and lower exit planes of the beam splitter prism 1108, to incline the direction of the light beams. Being applied with a voltage, an orientation of the liquid crystals of the liquid crystal elements 1117 changes owing to potential gradient in the sub scan direction, causing refractive distribution therein and inclining the direction of the light beam. Accordingly, the liquid crystal elements 1117 can change the scan positions on the photoconductive drums 1101, 1102 in accordance with applied voltage. The liquid crystal elements 1118 function similarly thereto.

The cylindrical lenses 1113, 1114 are vertically adjacent to each other to correspond with the two split light beams. One of them is rotatably disposed around the optical axis, and adjustable to make the focal lines parallel. The split light beams are incident via the cylindrical lenses 1113, 1114 on the upper and lower stage of the polygon mirror 1106 which are spaced at 6 mm in the sub scan direction.

The cylindrical lenses 1113, 1114 have positive curvature at least in the sub scan direction to converge the light beams on the polygon mirror 1106. They form an optical face tangle error correction system together with later-described toroidal lenses and the polygon mirror 1106, which make deflection points on the deflection surface of the polygon mirror 1106 conjugated with the photoconductive drums 1101 to 1104 in the sub scan direction.

The polygon mirror 1106 has four mirror faces in each stage and collectively deflects light beams from the VCSELs in each column on the same deflection surface. The upper and lower stages thereof are shifted in phase at 45 degrees so as to alternatively deflect light beams for scanning.

Figure 19:
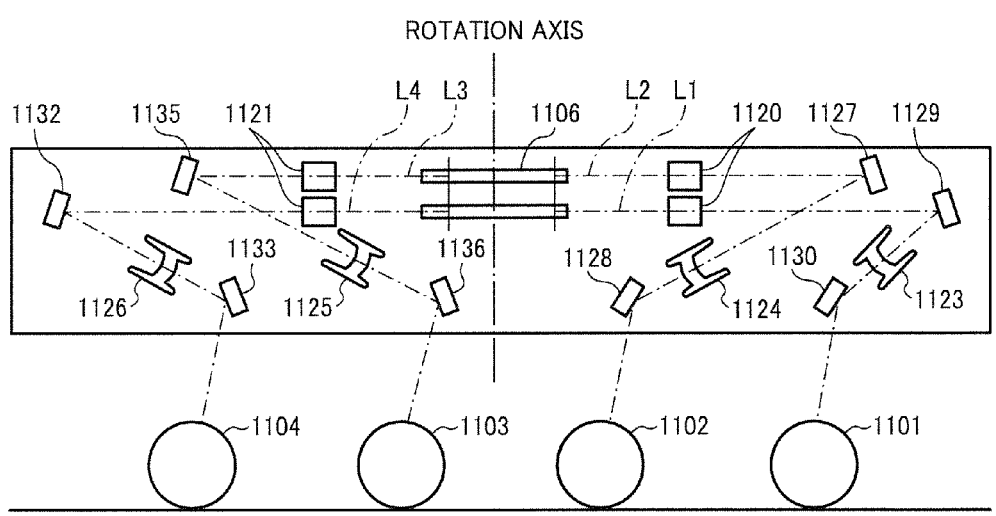
FIG. 19 shows optical paths of light beams in a cross section of the optical scan apparatus in sub scan direction.

FIG. 19 shows optical paths in cross section of the optical scan apparatus in the sub scan direction. Fθ lenses 1120, 1121 and toroidal lenses 1123 to 1126 constitute an optical imaging system in the drawing. These lenses are formed of plastic material. The fθ lens 1120, 1121 each have a non-circular arc surface to move the light beams in the main scan direction at constant velocity on the surfaces of the photoconductive drums 1101 to 1104 along with the rotation of the polygon mirror.

Having passed through the toroidal lens 1123 to 1126, the light beams are deflected by the polygon mirror 1106 to be incident on optical detectors, 1138, 1140, 1142, 1144 at scan start side and on optical detectors 1139, 1141, 1143, 1145 at scan end side (FIG. 17).

According to detection signals from the optical detectors 1138, 1140, 1142, 1144, a not-shown controller generates synchronous detection signals for the VCSELs and controls write start timing for the photoconductive drums 1101 to 1104 according to the synchronous detection signals.

The controller obtains a difference in time between output of the detection signals from the optical detectors 1138, 1140, 1142, 1144 and output of the detection signals from the optical detectors 1139, 1141, 1143, 1145 to obtain an actual scan time taken for a single scanning. Shifts of focus positions in the main scan direction are corrected by varying pixel clocks which controls each VCSEL according to a difference between the actual scan time and a predetermined reference value (described later).

Figure 20:
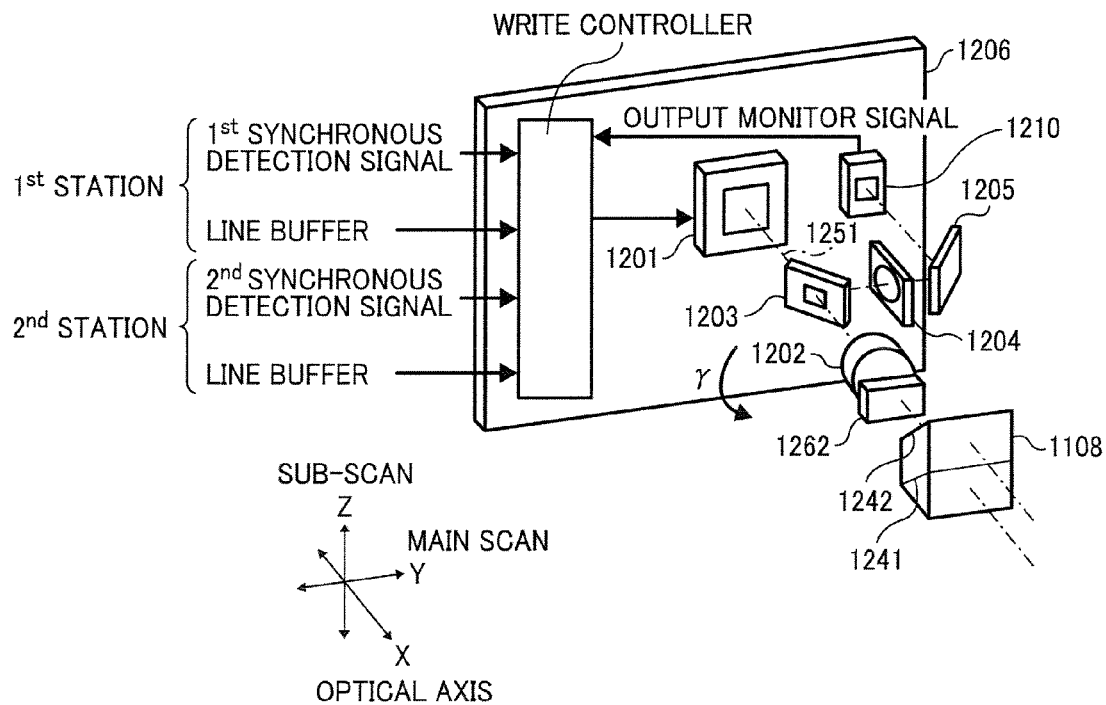
FIG. 20 shows a light source and optical elements near the light source.

As shown in FIG. 20, a light source 1201 as the vertical cavity surface emitting laser array is placed substantially symmetric to the optical axis of a coupling element 1202 which is determined as the optical axis of the light source.

Therefore, the optical axis of the light source corresponds to nearly the center of the light source 1201, or nearly the center of the VCSELs.

Each light beam from each VCSEL is converted into a parallel beam by the coupling element 1202 and converged near the focal point of backside of the coupling element 1202. After incident on a later-described correction lens 1262, the light beams are diffused in the main scan direction and incident on the fθ lens 1120 while they are converged again in the sub scan direction by the cylindrical lenses 1113, 1114 near the deflection surface of the polygon mirror and incident on the fθ lens 120. With a correction lens 1262 made of resin, it is able to correct positional shift of the coupling element 1202 due to variation in ambient temperature and beam waist variations in the main scan direction due to wavelength shift of the light source 1201.

In FIGS. 17, 19, a light beam L1 output from the lower stage of the beam splitter prism 1108 is deflected by the lower stage of the polygon mirror 106 via the cylindrical lens 1113. Then, the light beam L1 passes through the lower stage of the fθ lens 1120 to be incident on the toroidal lens 1123 via a return mirror 1129 and form a spot-like image on the surface of the photoconductive drum 1101 via a return mirror 1130. Thereby, a latent image is formed according to yellow color image information in the first image formation station.

A light beam L2 output from the upper stage of the beam splitter prism 108 is deflected by the upper stage of the polygon mirror 106 via the cylindrical lens 1114. Then, the light beam L2 passes through the upper stage of the fθ lens 1120 to be incident on the toroidal lens 1124 via a return mirror 1127 and form a spot-like image on the surface of the photoconductive drum 1102 via a return mirror 1128. Thereby, a latent image is formed according to magenta color image information in the second image formation station.

A light beam L3 output from the upper stage of the beam splitter prism 1110 is deflected by the upper stage of the polygon mirror 1106 via the cylindrical lens 1116. Then, the light beam L3 passes through the upper stage of the fθ lens 1121 to be incident on the toroidal lens 1125 via a return mirror 1135 and form a spot-like image on the surface of the photoconductive drum 1103 via a return mirror 1136. Thereby, a latent image is formed according to cyan color image information in the third image formation station.

A light beam L4 output from the lower stage of the beam splitter prism 1110 is deflected by the lower stage of the polygon mirror 1106 via the cylindrical lens 1115. Then, the light beam L4 passes through the lower stage of the fθ lens 1121 to be incident on the toroidal lens 1126 via a return mirror 1132 and form a spot-like image on the surface of the photoconductive drum 1104 via a return mirror 1133. Thereby, a latent image is formed according to black color image information in the fourth image formation station.

FIG. 20 shows the structure of a light source unit which comprises a mirror 1205, a substrate 1206, an optical detector 1210, a beam splitter prism 1108 with a half mirror surface 1241 and a mirror surface 1242, the coupling element 1202, the optical axis 1251, and the correction lens 1262.

Figure 21:
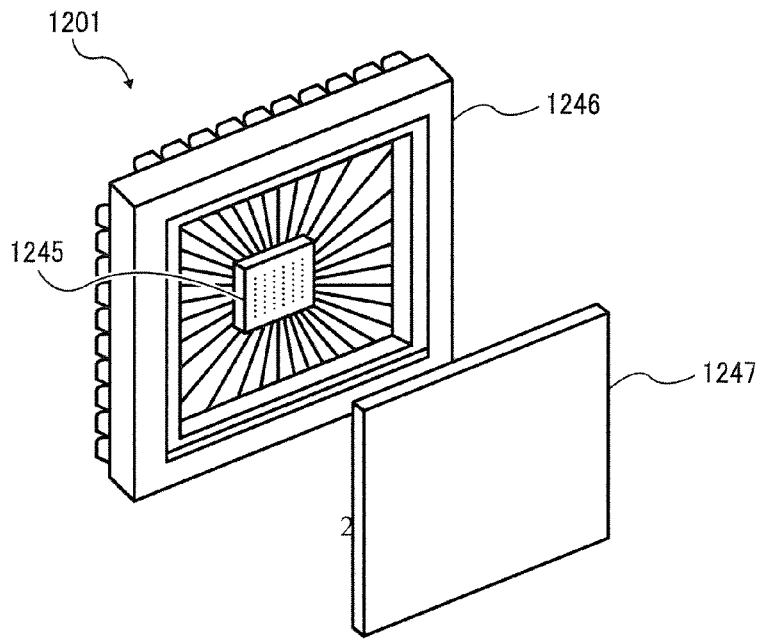
FIG. 21 shows a vertical cavity surface emitting laser array.

FIG. 21 shows the structure of the light source 1201 having a light emitting element 1245 as a VCSEL array chip, a package 1246, and a glass plate 1247. The light emitting element 1245 are two-dimensionally, monolithically arranged VCSELs, and fixed in the center of the package 1246 by an epoxy adhesive so that the surface on which they are arranged is in parallel with the exit (upper) surface of the package. The package 1246 in which lead terminals are radially disposed is filled with inert gas and sealed with the glass plate 1247.

In FIG. 20, the position of the coupling element 1202 is adjusted in the main and sub scan and optical axis directions so that a plurality of light beams from the VSCELs become parallel beams and the arrangement thereof is symmetric to the optical axis of the coupling element 1202 in a plane (yz plane) orthogonal to the optical axis thereof.

The beam splitter 1203 in a plate form is inclined at a predetermined angle (45 degrees) in the main scan direction. It has a reflective surface reflecting a light beam on the light source 1201 side, and an opening at the center. The opening is smaller in diameter than beam diameter and has a part of the light beam pass therethrough to the polygon mirror 1106. The rest of the light beam not passing through the opening is reflected on the reflective surface and guided to the optical detector 1210 via a convergent lens 1204 and the mirror 1205. In a period in which the light beams deflected by the polygon mirror 1106 reaches the image formation areas of the photoconductive drums, the optical detector 1210 detects intensity of the light beams sequentially output from the VCSELs and compares it with a predetermined reference value so as to set a value of current supplied to the VCSELs and control the output of VCSELs to a predetermined value. The set current value is maintained to constantly maintain the beam intensity until the next scanning.

According to the present embodiment, the optical detector 1210 is mounted on the substrate 1206 as well as the light source 1201 so that the detection signals are insusceptible to external noise or the like.

On the substrate 1206 also disposed are a power control circuit which maintains the output of the VCSELs at a constant level, and a drive circuit which controls the VCSELs according to image information. The substrate 1206 and the coupling element 1202 are integrally supported and constitute the light source.

According to the present embodiment, the VCSELs are two-dimensionally arranged in 4 rows and 8 columns in the main and scan directions, respectively. They need be arranged in a plane orthogonal to the optical axis of the coupling element 1202 in order to prevent the light beams from the coupling element 1202 from being converged differently. Because of this, the coupling element 1202 is disposed so that the arrangement plane of the light source 1201 is to be parallel to a plane 1250 (FIGS. 23A, 23B) orthogonal to the optical axis. Thereby, the light beams from the VCSELs are converged in the same state at positions in the main scan direction where the longitudinal magnification of the optical imaging system is high. Accordingly, it is possible to prevent periodic unevenness in image density due to shifts (variation in beam spot size) of the focusing positions (beam waist position) on the photoconductive drums. It is also possible to prevent degradation of images such as changes in color representation depending on which one of the light beams scans the first scan line.

The beam splitter prism 1108 includes a half mirror surface 1241 and a mirror surface 1242 in parallel to the half mirror surface 1241. A half of the light beams from the light source 1201 are reflected on the half mirror surface 1241 and the other half thereof transmit therethrough and are vertically split into two. The two split light beams are emitted in the sub scan direction with an equal interval. According to the present embodiment, the interval is set to 6 mm which is equal to the interval between the upper and lower stages of the polygon mirror and those of the fθ lens.

Figure 22:
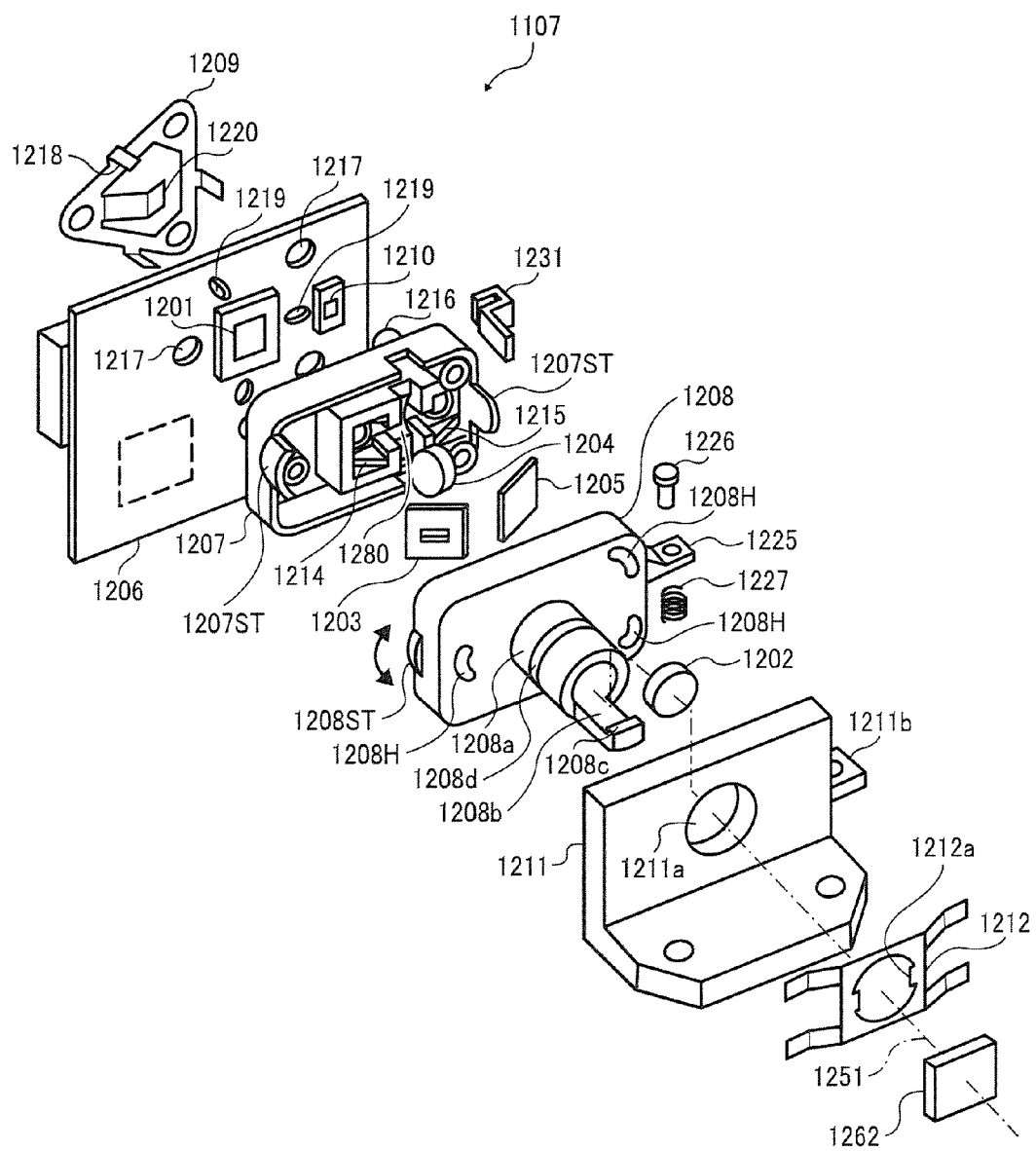
FIG. 22 is an exploded perspective view of the light source unit.

FIG. 22 is an exploded perspective view of the light source unit 1107. The structure of the light source unit 1109 is the same as that of the light source unit 1107, so that a description thereof will be omitted.

Figure 23A:
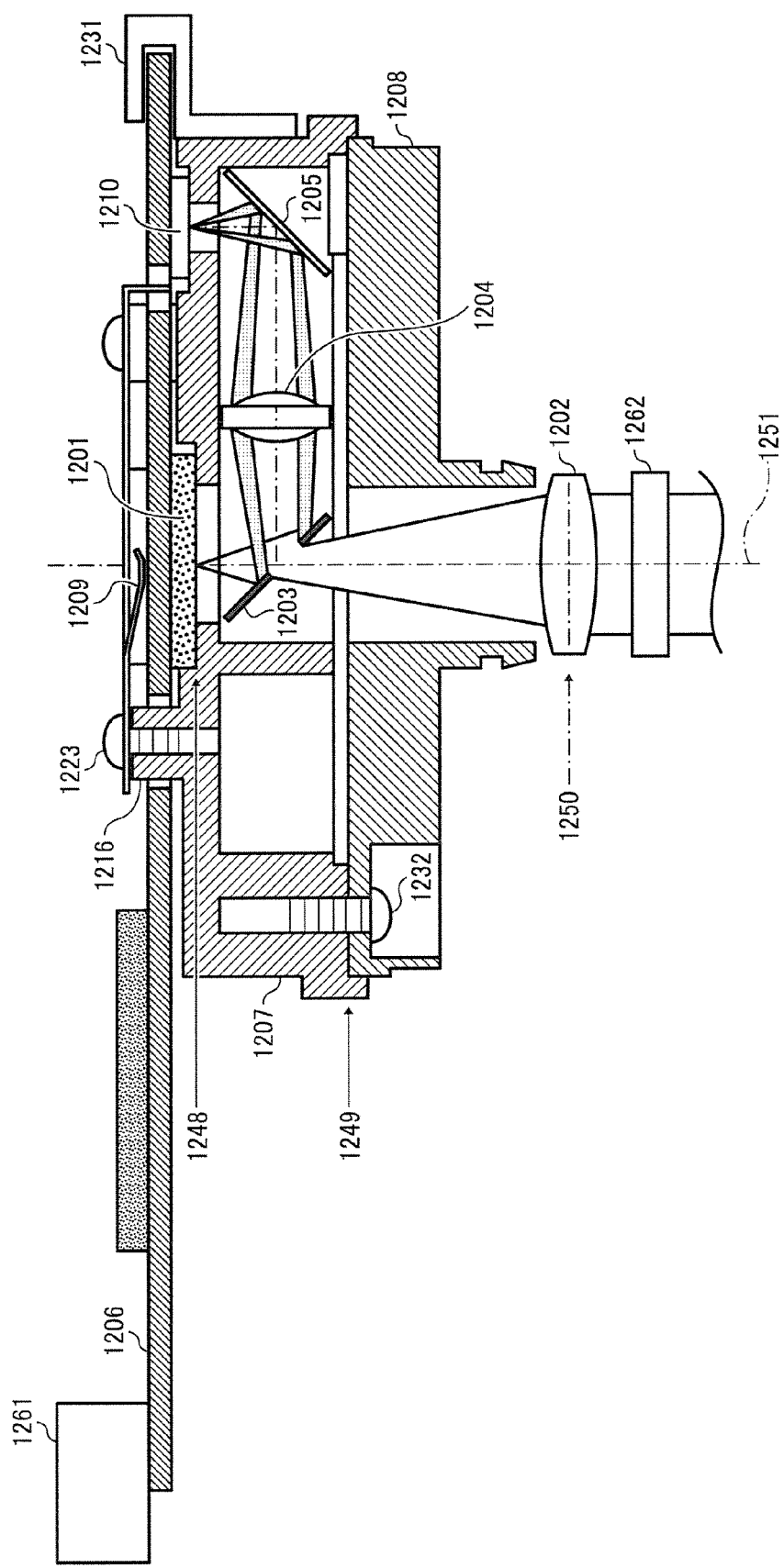
FIGS. 23A and 23B are cross sectional views of the light source in the main scan direction.
Figure 23B:
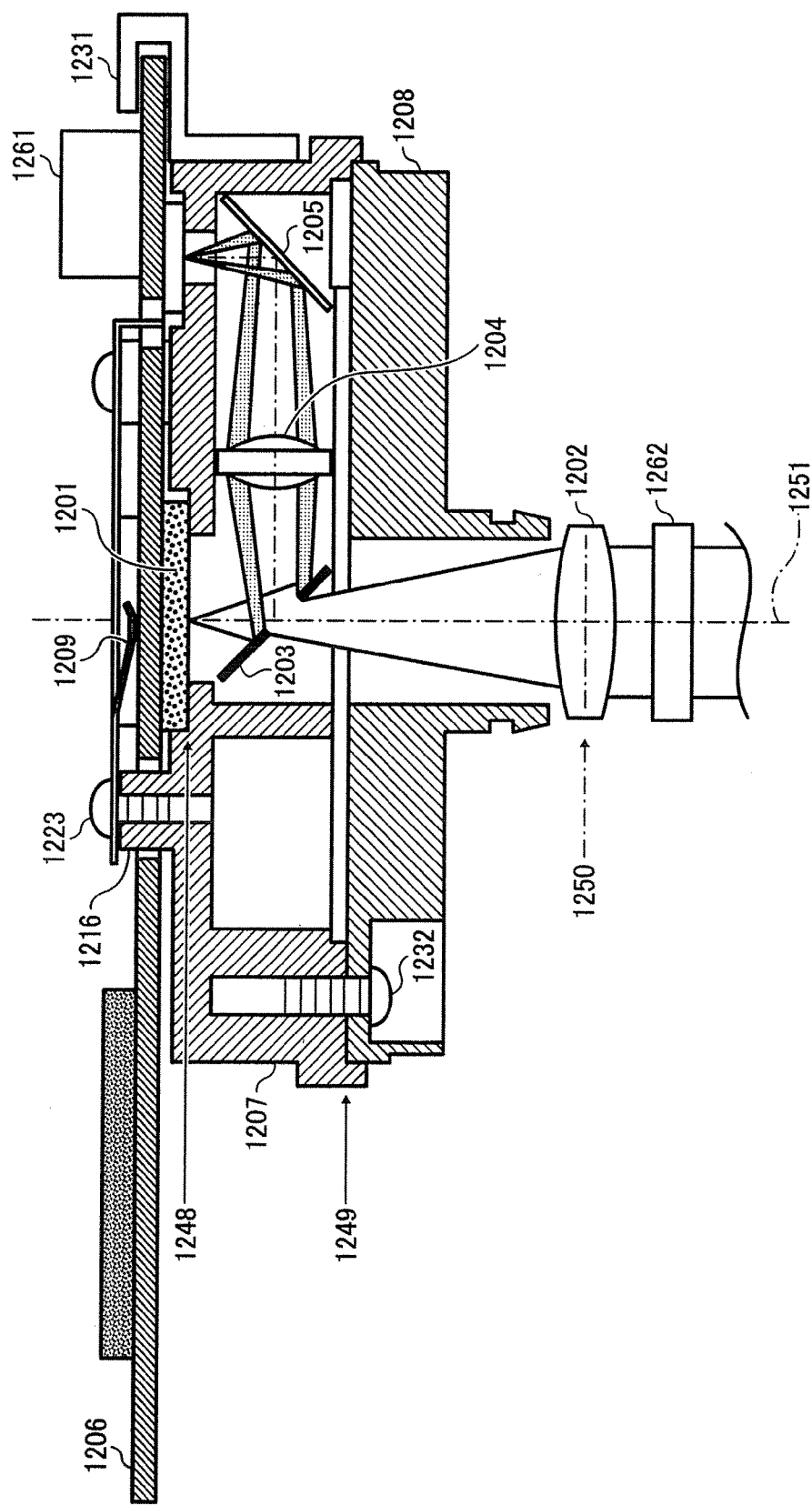

FIG. 23A shows a cross section of the light source unit 1107 in the main scan direction, and FIG. 23B shows the same of a modified example of the light source unit 1107. The light source unit 1107 is integrally composed of the first support portion 1207 supporting the substrate 1206 with the light source 1201 and the second support portion 1208 supporting the coupling element 1202. They are joined via a plane orthogonal to the optical axis 1251 of the coupling element 1202 and fastened with a screw 1232 (fastening member).

The first and second support portions 1207, 1208 have arc-shaped fitting portions 1207ST, 1208ST (fan-shaped in the present embodiment) substantially around the optical axis 1251, respectively. With long holes 1208H of the second support portion 1208, the rotation direction thereof can be adjusted around the optical axis 1251. The rotation direction is adjusted by a jig or the like according to a difference in amounts of light from the VCSELs most distant from each other in such a manner as to reduce the difference to a minimum. After the adjustment, the first and second support portions are fastened. Accordingly, it is possible to adjust a relative position between the light source unit 1107 and the optical systems after the coupling element as well as to accurately define a relative position among the 32 VCSELs, the correction lens 1262, and an aperture member. Further, amounts of light from the most distant VCSELs can be constant, preventing deterioration in the characteristics of the light beam such as beam spot size.

According to the present embodiment, the first and second support portions are formed by aluminum die casting, however, they can be made of a different material as long as its thermal expansion coefficient is equivalent to that of aluminum.

For detecting beam intensity from the light source 1201, the beam splitter 1203, the convergent lens 1204, and the return mirror 1205 returning the light beam to the optical detector 1210 are mounted on the first support portion 1207.

Figure 24:
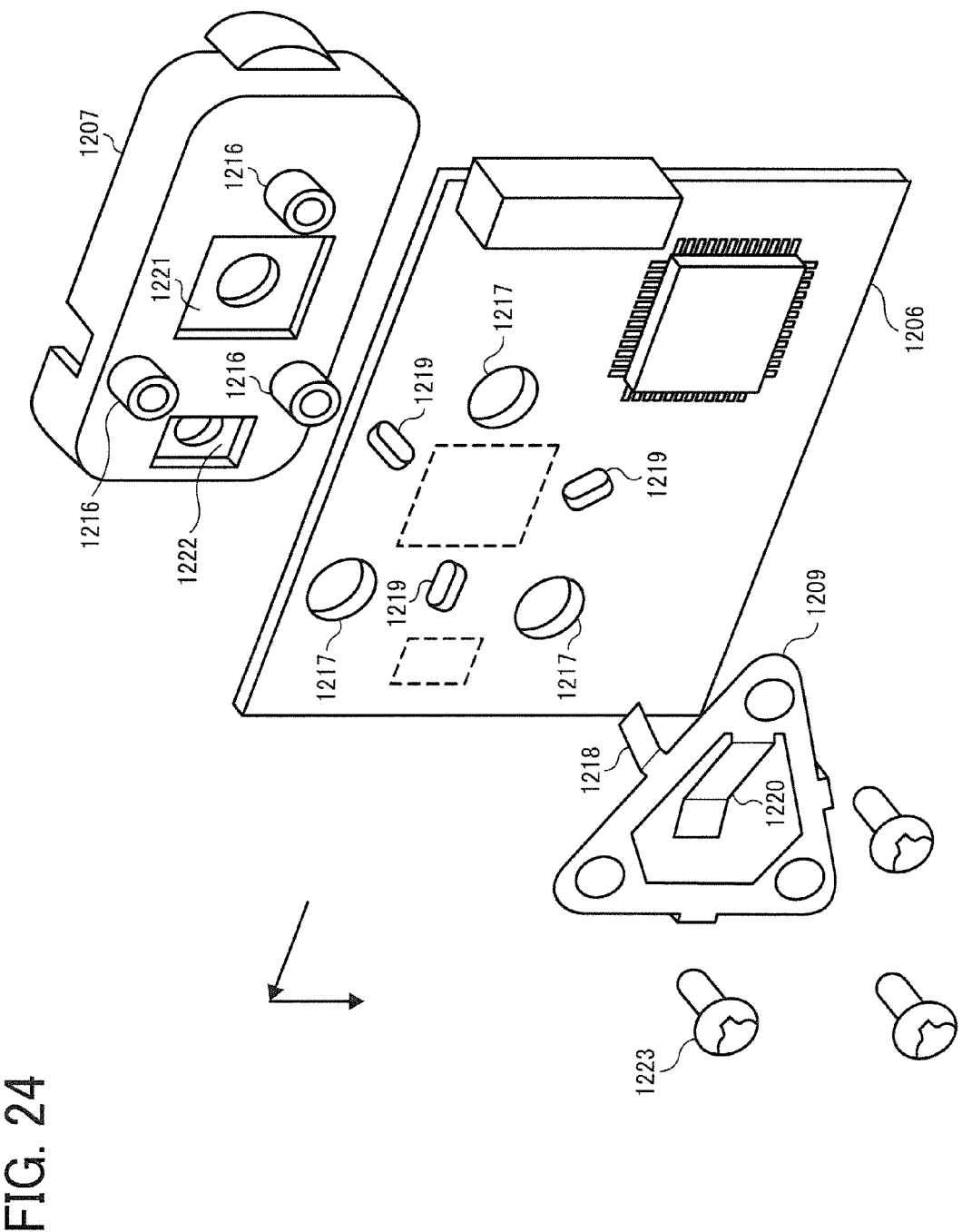
FIG. 24 shows how a substrate is attached using a bias member.

FIG. 24 is a view for assembly of the substrate 1206. In mounting the substrate 1206 on the first support portion 1207, the upper surface (exit plane) of the package of the light source 1201 is brought into contact with a concavity 1221 on the first support portion 1207 to determine the position of the substrate 1206 on a plane orthogonal to the optical axis, while two adjacent side surfaces of the package are brought into contact with the inner surface of the concavity 1221 to determine the position thereof in a direction orthogonal to the optical axis. Also, the upper surface (light receiving plane) of the optical detector 1210 is brought into contact with a concavity 1222.

Further, according to the present embodiment, a bias member 1209 made of a plate includes a blade spring 1220 which presses the substrate 1206 from behind to the first support portion 1207. It also includes three anchor portions (bend portion) 1218 which fit into three holes 1219 of the substrate 1206 to hold it in directions of the arrows in FIG. 24. In such a manner, the light source 1201 is positioned relative to the first support portion 1207.

The first support portion 1207 has three cylindrical portions 1216 which fit through three round holes 1217 in the substrate 1206. The substrate 1206 is supported by the first support portion 1207 by fastening the bias member 1209 onto the cylindrical portions with the screws 1223. According to the present embodiment, the substrate 1206 is not directly joined with the first support portion 1207 but pressed by the bias member 1209 from behind. With such a configuration, it is possible to accurately position the light source 1201 on the first support portion 207 without placing any load on the substrate 1206.

Figure 25:
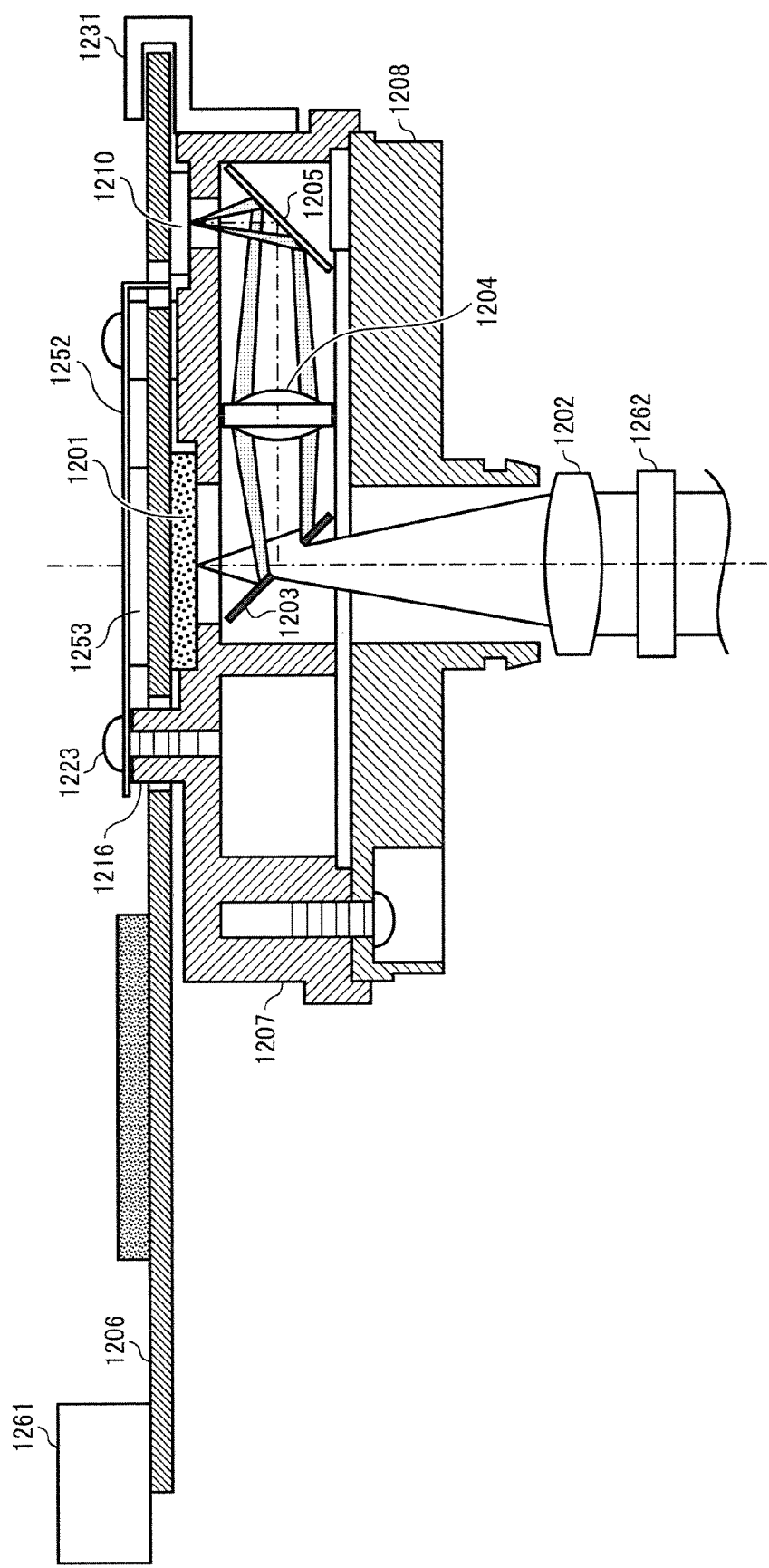
FIG. 25 shows that the substrate is attached using another bias member.

FIG. 25 shows another example of the bias member 1209 which includes an elastic member 1253 such as a rubber in replace of the blade spring 1220. The bias member 1209 can be made of a resin material or the like as long as the material is elastic.

Figure 26:
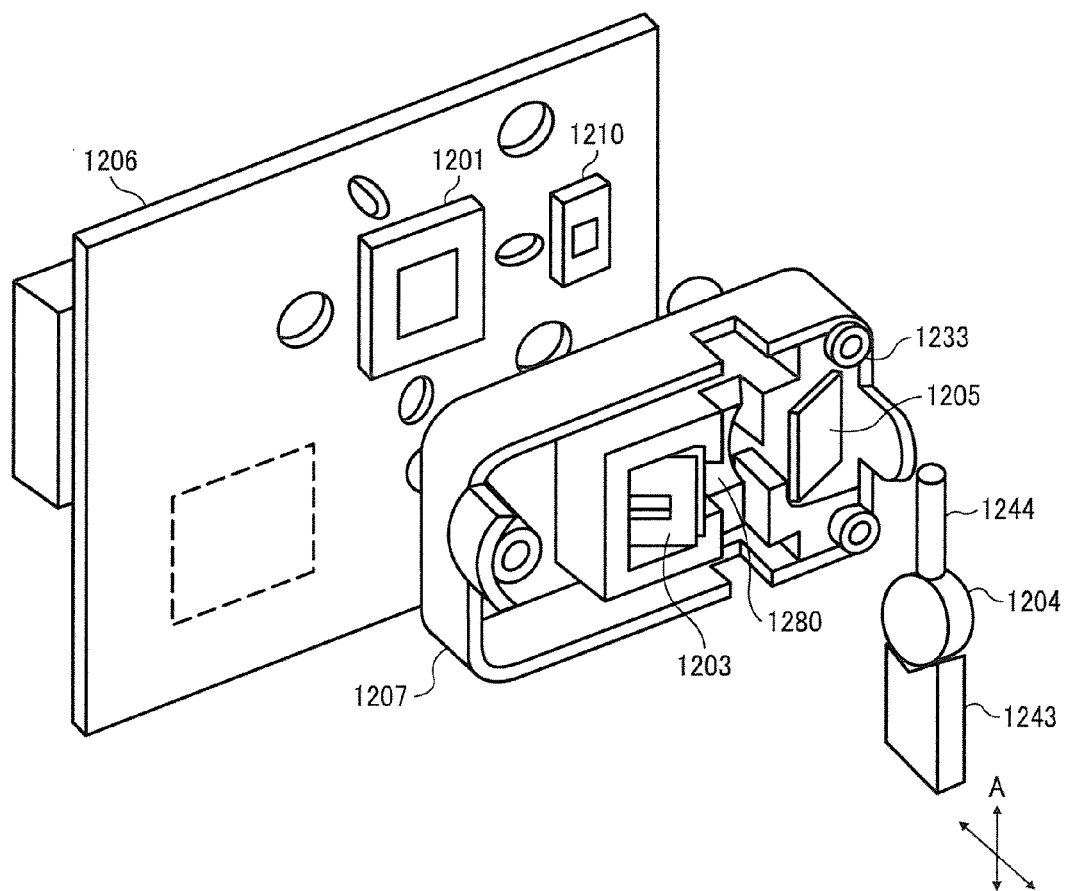
FIG. 26 shows how a convergent lens is mounted.

With reference to FIGS. 22, 26, how to mount the convergent lens 1204 will be described. The first support portion 1207 includes inclined planes 1214, 1215 on which the beam splitter 1203 and the mirror 1205 are mounted, respectively.

The first support portion 1207 includes a cylindrical plane 1280 on which the convergent lens 1204 is fixed. The convergent lens 1204 is placed between a clamp member 1243 with a V-form groove on the top surface and a clamp member 1244 with a flat bottom surface. The position of the convergent lens 1204 is adjusted in a direction of the arrow A (orthogonal to the optical axis) so as to have the light beams from the light source 1201 be incident on the optical detector 1210, and fixed on the cylindrical plane 1280 by filling and solidifying an adhesive into a gap between the outer edge portion of the convergent lens 1204.

The assembled first support portion 1207 is joined with the second support portion 1208 by the screw 1232.

The second support portion 1208 includes a cylindrical portion 1208a with a cylindrical plane 1208b at an end which forms a gap between the edge portion of the coupling element 1202. After adjusted in position relative to the light source 1201, the coupling element 1202 is fixed with the cylindrical plane 1208b by filling and solidifying an adhesive in the gap.

The correction lens 1262 is adhered to a flat portion 1208c at the furthest end of the cylindrical plane 1208b.

A holding member 1231 is provided to hold the end of the substrate 1206 and to be adhered to the side surface of the first support portion 1207. It prevents the light source 1201 from being displaced from the first support portion 1207 when after the assembly, the substrate 1206 happens to receive some impact from outside, such as when in handling the light source 1201, the substrate 1206 is accidentally made in contact with another component, or when a not-shown harness connected with the connector 1261 is pulled or detached. The holding member 1231 can be fixed with screws. In order to further prevent the displacement of the light source 1201, the substrate 1206 and the holding member 1231 can be fixed by adhesion, screws, or the like.

The present embodiment is configured to prevent the displacement of the light source 1201 in the direction orthogonal to the plane on which it is disposed. It can also be configured to prevent the displacement in another direction depending on the position or posture (a direction where the harness is detached) of the connector 1261 on the substrate 1206 or on type of expected impact from outside.

For example, in FIG. 23B disposing the holding member 1231 near the connector 1261 makes it possible to further effectively prevent the light source 1201 from displaced due to the impact from the harness or detachment thereof.

In the light source unit 1107 according to the present embodiment, the plane on which the VCSELs are arranged is parallel to the upper surface of the package, the joint surface 1248 of the package is parallel to the joint surface 1249 between the first and second support portions 1207, 1208, and the joint surface 1249 is parallel to the plane 1250 orthogonal to the optical axis of the coupling element 1202 as shown in FIGS. 23A, 23B. Thereby, the plane on which the VCSELs are arranged, the plane orthogonal to the optical axis of the coupling element 1202, and a plane of the second support portion 1208 to be joined with the bracket member 1211 (FIG. 22) are made in parallel with one another.

The light source unit 1107 is rotatably supported in the plane orthogonal to the optical axis 1251 by inserting the cylindrical portion 1208a of the second support portion 1208 into a hole 1211a in the bracket member 1211 and engaging a nail 1212a of the blade spring 1212 with a groove 1208d of the cylindrical portion 1208. It is fixed in a not-shown housing incorporating the polygon mirror 1106, the fθ lens 1120, and other components.

The second support portion 1208 is provided with an arm portion 1225 (FIG. 22). The arm portion 1225 and a screw hole 1211b of the bracket member 1211 are fitted with each other by a screw 1226 via a spring 1227. By adjusting an amount of rotating the screw 1226, the direction on which the VCSELs are arranged is moved by γ around the optical axis 1251 to such a direction so that beam spots are at a predetermined sub-scan pitch on the photoconductive drums. The arm portion 1225, screw 1226, spring 1227, bracket member 1211 and screw hole 1211b are equivalent to the rotatable adjuster.

Figure 27:
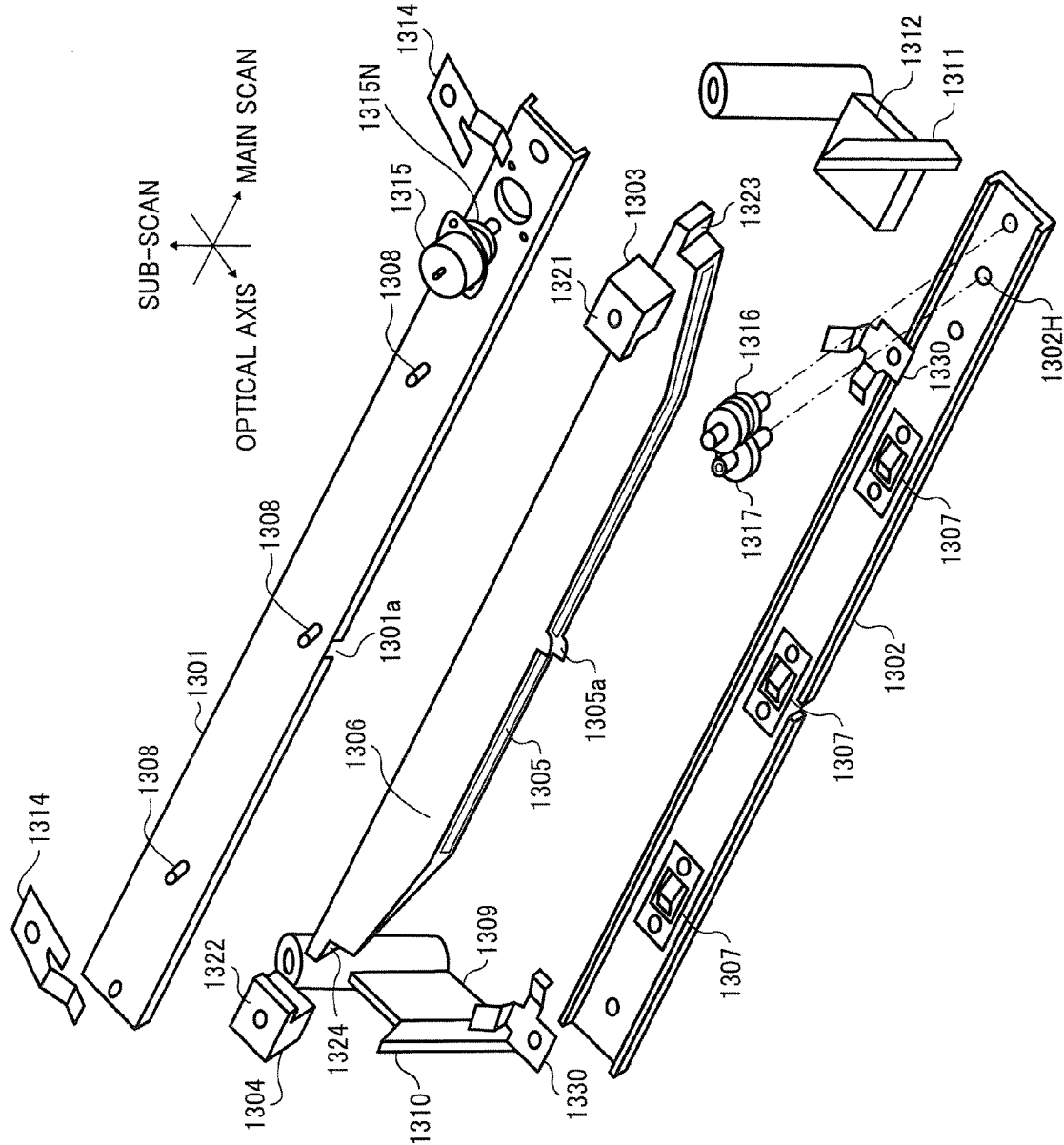
FIG. 27 is an exploded perspective view of a housing for toroidal lenses.

FIG. 27 shows the structure of housing for the toroidal lens 1123 to 1126. Here, the toroidal lenses 1123 to 1126 are collectively referred to as toroidal lens 1305. The housing comprises a support plate 1301, a holding plate 1302, spacing members 1303, 1304, a blade spring 1307, a screw 1308, plates 1309, 1312, plates 1310, 1311, blade springs 1314, a stepping motor 1305, a deaccerelation gear 1316, and a movable cylinder 1317.

The toroidal lens 1305 is integrally formed with a rib 1306 to surround a lens portion, and at the center of the rib a protrusion 1305a is formed for position adjustment. The support plate 1301 and holding plate 1302 have bent edges on short sides thereof to hold the spacing members 1303, 1304 so that they face each other. The toroidal lens 1305 is contained in the space formed by the two plates.

The protrusion 1305a of the toroidal lens 1305 is engaged with a notch 1301a of the bent edge of the support plate 1301. The toroidal lens 1305 is positioned in the sub scan direction by bringing the lower surfaces of extended portions 1321, 1322 of the spacing members 1303, 1304 into contact with both upper ends of the rib 1306. Flanges 1323, 1324 protruding from both ends of the rib 1306 in longitudinal direction are brought into contact with sides of the spacing members 1303, 1304 to position the toroidal lens 1305 in the optical axis direction. The both ends of the toroidal lens 1305 are biased from above and side by a pair of blade springs 1330 which are supported by the spacing members 1303, 1304 and the holding plate 1302, respectively. This allows the toroidal lens 1305 to be extendable in the longitudinal direction when thermally expanded.

The support plate 1301 has holes into which screws 1308 are fitted. The tips of the screws 1308 are brought into contact with three places on the upper surface of the rib 1306. Blade springs 1307 provided on the holding plate 302 bias the lower surface of the rib 1306. Due to its long shape and low rigidity, the toroidal lens 1305 can be deformed (distorted) by a very small stress or a thermal expansion difference due to a variation in ambient temperature. However, in the present embodiment, supporting the toroidal lens 1305 at the three places along the support plate 1301 makes it possible to maintain the linear shape thereof stably.

On the bottom of a not-shown housing, two attachment members with portions 1309 to 1312 stand. The support plate 1301 larger than the toroidal lens 1305 and placed thereabove is supported at one end (left end in FIG. 27) by the portions 1309, 1310, positioned in the sub scan and optical axis directions and biased by the blade spring 1314. The stepping motor 1315 is fixed at one end (right end in FIG. 27) of the toroidal lens 1305. A feed screw 1315N formed on a shaft of the stepping motor 1315 is screwed into the deaccerelation gear 1316. The tip of the movable cylinder 1317 fitted with the deaccerelation gear 1316 inserts through a hole 1302H in the holding plate 1302. The other end of the toroidal lens 1305 is supported by the portions 1311, 1312, positioned in the sub scan and optical axis directions and biased by the blade spring 1314. The toroidal lens 1305 is movable at the other end in the sub scan direction by rotation of the stepping motor 1315.

The toroidal lens 1305 is adjustable in accordance with the forward reverse rotation of the stepping motor 1315 in the plane orthogonal to the optical axis at a fulcrum point of the portion 1309. The forward reverse rotation of the stepping motor 1315 inclines the focal line of the toroidal lens 1305 in the sub scan direction, making it possible to adjust the focusing position of the toroidal lens, that is, the inclination of the scan line on each photoconductive drum. Accordingly, it is possible to correct the position of the toroidal lens in such a manner as to make the scan lines on the respective image formation stations parallel to each other.

The movable cylinder 1317 is moved relative to the rotation angle of the stepping motor 1315 depending on the pitch of the feed screw 1315N. In the present embodiment, aiming for more accurate adjustment, the rotation of the feed screw 1315N is transmitted to the movable cylinder 1317 via the deaccerelation gear 1316. The rotation of the stepping motor 1315 is transmitted to the movable cylinder 1317 via the first gear of the feed screw 1315N on the shaft, the second and third gears of the deaccerelation gear 1316, and the fourth gear of the movable cylinder 1317 in this order. By adjusting the number of teeth of each gear when appropriate, the tip of the movable cylinder is movable by a minute amount.

The deaccerelation gear 1316 and the movable cylinder 1317 are rotatably supported between the support plate 1301 and the holding plate 1302.

According to the present embodiment, the toroidal lenses 1123 to 1125 for the first to third image formation stations have such inclination correct mechanism, which allows automatic correction for the inclination of the other color scan lines from a black color scan line based on a later-described detection result.

Figure 28:
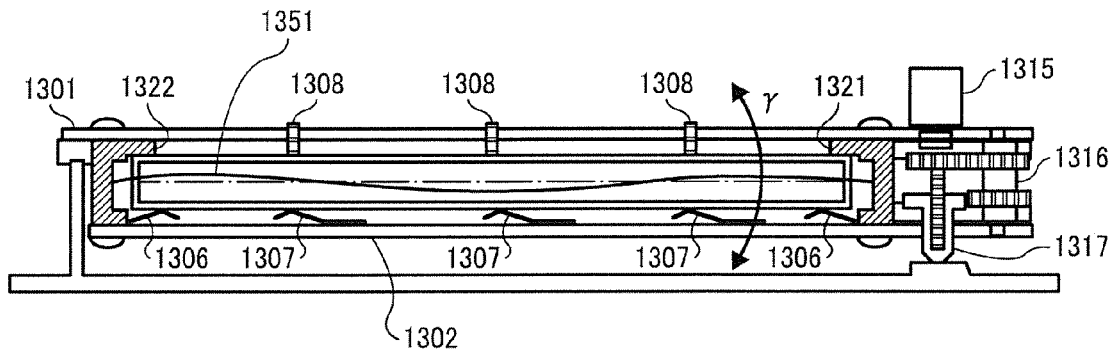
FIG. 28 shows that the toroidal lenses are mounted on the housing, seen from the optical axis direction.

FIG. 28 shows the toroidal lens mounted on the housing, seen from the optical axis direction. When the projecting three screws 1308 do not reach the extended portions 1321, 1322, the toroidal lens 1305 is distorted so that the focal line 1351 thereof has a convex shape. In contrast, when the projecting three screws 1308 go below the extended portions 1321, 1322, the toroidal lens 1305 is distorted so that the focal line thereof has a reverse convex shape. Accordingly, adjusting the screws 1308 makes it possible to curve the focal line of the toroidal lens in the sub scan direction and accurately correct the curving of the scan lines.

Generally, the scan line is curved in various forms such as a convex, a reverse convex, M- or W-form, or a sinwave owing to positional errors in the optical elements constituting the optical system, and/or contortion or distortion thereof at the time of molding. In order to prevent this, the toroidal lens 1305 is curved at three points in the main scan direction in such a manner as to cancel the curving of the scan line and correct it to be straight on each photoconductive drum. In the present embodiment, at assembly, all the toroidal lenses are adjusted by the screws 1308 so as to make the shapes of the curves of the scan lines coincident with each other in all the image formation stations.

Figure 29:
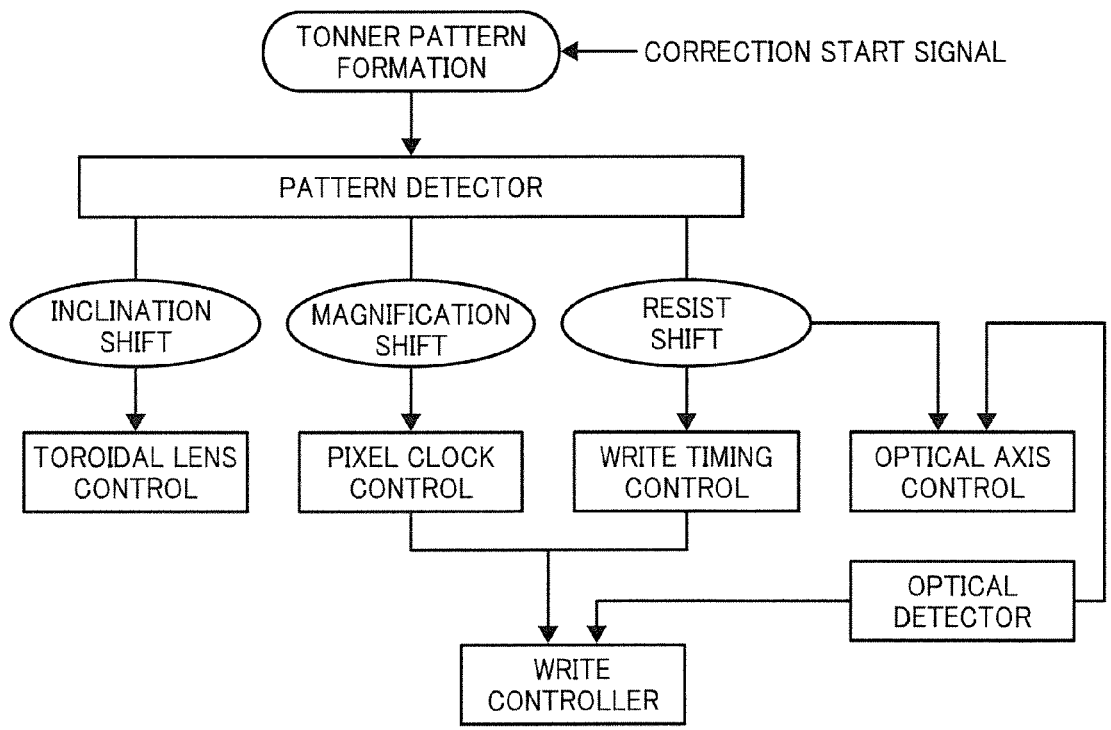
FIG. 29 is a block diagram for correction for shifts of focus positions of beam spots in the optical scan apparatus.

FIG. 29 shows a shift control for focusing position of a light beam spot according to the present embodiment. The shift in the focusing positions in the image formation stations is corrected at predetermined timing such as at power-on of the apparatus, recovery from a stand-by state, or at the number of prints' exceeding a predetermined number, by reading superimposition of the respective color images from detection pattern SP of the toner images formed on the transfer belt 1105 in FIG. 17.

Referring to a specific station as a reference, resist and magnification of the optical system in the main scan direction and resist and inclination thereof in the sub scan direction are detected for the rest of the stations as a relative shift. The resist in the main scan direction is corrected by changing generation timing for a synchronous detection signal, and the magnification in the main scan direction is corrected by varying a pixel clock for controlling each VCSEL.

Meanwhile, for correction of the resist in the sub scan direction, the write timing is set for each face of the polygon mirror so that a shift in the resist is to be smallest in unit of 32 line pitch. In addition, the write start position in the first scan line is aligned in unit of a single line pitch by selecting a column of the VCSELs to emit light forming the first scan line. The inclination in the sub scan direction is corrected by inclining each toroidal lens by rotation of the stepping motor as described above.

A pattern detector for detection pattern of toner images includes as shown in FIG. 17 an LED device 1154 for illumination, a photosensor 1155 receiving reflected light, and a collective lens 1156. The pattern detector detects the detection pattern which is inclined by about 45 degrees relative to the main scan line along with movement of the transfer belt, and calculates a difference in time between the detections (in FIG. 29). According to the present embodiment, three pattern detectors are provided at three positions, at the center and right and left ends to detect inclination from a difference in detection time between the right and left pattern detectors, and detect magnification from that between the central pattern detector and the right and left pattern detectors. The obtained values are corrected to match with the value for the reference formation station.

However, there is a drawback in the correction that during the correcting operation, the apparatus has to stop printing operation. At a high correction frequency, printing performance thereof decreases and extraneous toner consumption increases. Therefore, it is preferable to reduce the correction frequency, that is, stably maintain the beam spot positions in a long time.

Figure 30:
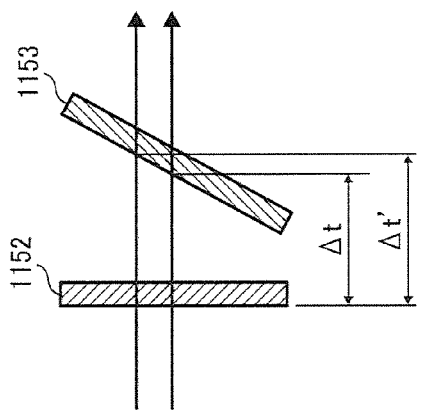
FIG. 30 shows a photosensor.

FIG. 30 shows the photosensor 1155 according to the present embodiment which is constituted of a photodiode 1152 orthogonal to the main scan direction and a photodiode 1153 not parallel to the photodiode 1152. It constantly detects a time tp0 which a light beam takes to sweep from a photosensor 1155 at the scan start position to the photodiode 1152, as well as a time tp1 which a light beam takes to sweep from the photosensor 1155 at the scan start position to the photodiode 1153. In accordance with a change in the time tp0, variation of the main scan magnification is corrected by resetting a reference value for the pixel clock in a correction mode while in accordance with a difference between the time tp0 and the time tp1, a shift $\Delta y$ of an focusing position of the light beam in the sub scan direction is corrected.

The shift $\Delta y$ in the sub scan direction is expressed by the following expression:

$$\Delta y = (V/\tan \gamma) \cdot (\Delta t - \Delta t') = k \cdot P + \Delta P$$

where $\gamma$ is incidence angle of the photodiode 1153, V is scan speed of the light beam, and P is a single line pitch. A shift equivalent to a single line pitch or more can be corrected by selecting a column of the VCSELs while a shift $\Delta P$ equivalent to less than a single line pitch can be feedback-corrected by the liquid crystal elements 1117, 1118. Thereby, scan positions can be maintained so as to prevent the shift in the sub scan resist of the four color images.

Figure 31A:
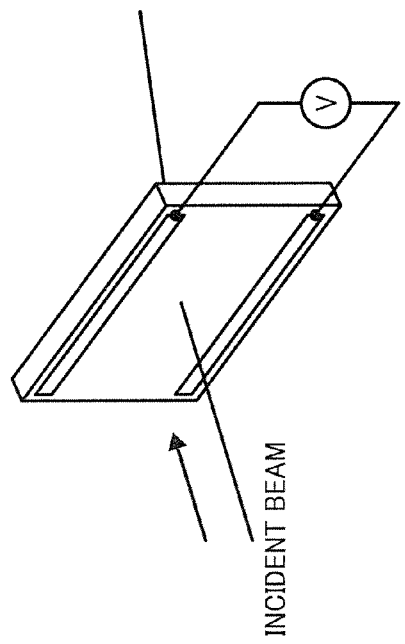
FIGS. 31A to 31D show overview of a liquid crystal deflection element as an optical axis adjuster.
Figure 31D:
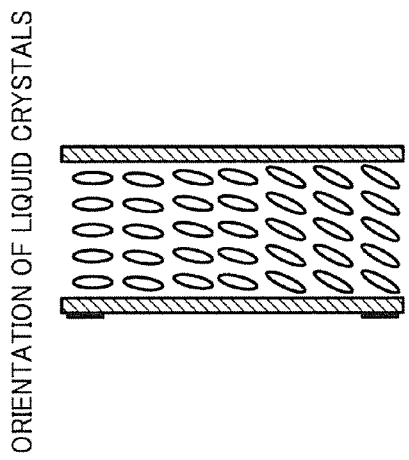
Figure 31C:
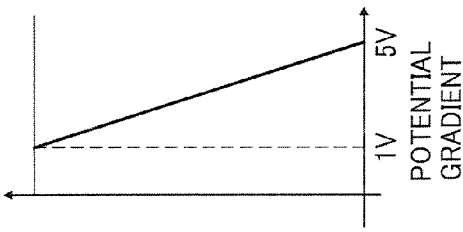
Figure 31B:
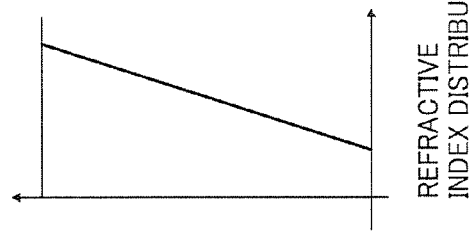

FIG. 31A is a perspective pattern diagram of the liquid crystal elements 1117, 1118 as optical axis adjuster. FIG. 31B shows refractive index distribution thereof, FIG. 31C shows potential gradient thereof, and FIG. 31D shows orientation of liquid crystals. The liquid crystal elements 1117, 1118 are made by encapsulating liquid crystals between two transparent glass plates. On the top and bottom of the surface of one of the glass plates, two electrodes are provided. With a potential difference between the electrodes, potential gradient occurs as in FIG. 31C which changes the orientation of the liquid crystals and causes refractive index distribution. Thus, the exit axis of the light beam can be slightly inclined as in prism. The liquid crystal can be nematic liquid crystal with dielectric anisotropy or the like. With the electrodes on the top and bottom of the glass plate in the sub scan direction, the scan position is variable on the surface of the photoconductive drum according to applied voltage.

FIG. 32 shows an example of the detection patterns. In FIG. 32 $\Delta$ty represents a difference in detection time between a reference black color pattern (K) and a yellow color pattern (Y), and $\Delta$tm and $\Delta$tc represent differences in time between the black color pattern and magenta (M) and cyan (C) color patterns, respectively. t0, t1, t2 represent differences in detection time between inclined and horizontal lines of the black color and those of the other colors at detection positions 0, 1, 2. The detection pattern consists of horizontal lines in the main scan direction and inclined lines by 45 degrees relative to the main scan direction. In the drawing the transfer belt moves from the top to the bottom. Positional shifts in the four colors in the sub scan direction are obtained from the differences in the detection time, $\Delta$ty, $\Delta$tm, $\Delta$tc at the detection positions 0, 1, 2 while those in the main scan direction are obtained from differences between the differences t0, t1, t2 and a theoretical value t0.

Figure 33:
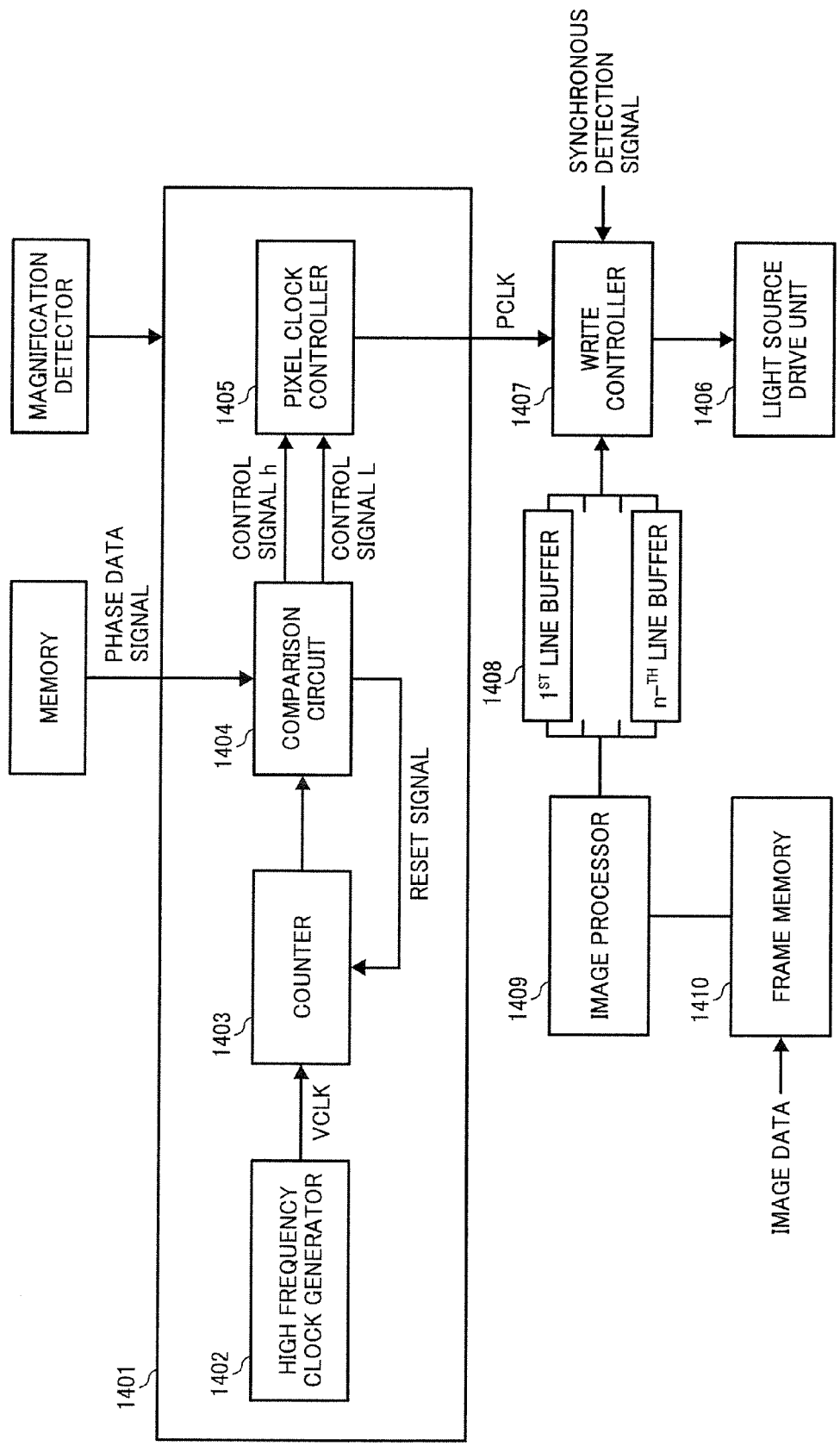
FIG. 33 shows a write controller and its periphery components.

FIG. 33 is for describing operation of a write controller. It shows a pixel clock generator 1401 including a high frequency clock generator 1402, a counter 1403, and a comparison circuit 1404, and a pixel clock controller 1405, a light source drive unit 1406, a write controller 1407, line buffers 1408, an image processor 1409 and a frame memory 1410.

Raster image data in the respective colors are temporarily stored in the frame memory 1410 and sequentially read therefrom by the image processor 1409. Image data on each scan line are formed according to the read image data in accordance with halftone matrix pattern and transferred to the line buffers 1408.

The write controller 1407 reads the pixel data from the line buffers 1408 by a synchronous detection signal as a trigger and outputs it to the light source drive unit 1406 which drives the light source for the image data according to a clock signal output from the pixel clock generator 1401. Selecting the line buffers 1408 in order for pixel data transfer makes it possible to switch the column of the VCSELs to write the first line.

Next, the pixel clock generator 1401 to control each VCSEL will be described. Therein, the counter 1403 counts high frequency clocks VCLK generated by the frequency clock generator 1402. The comparison circuit 1404 compares a counter value, a value L preset according to duty ratio of a pixel clock PCLK, and a phase data signal H which is supplied from exterior for transition timing for pixel clocks and indicates an amount of phase shift.

The pixel clock generator 1401 outputs a control signal L signifying a falling of the pixel clock PCLK, when the counter value coincides with the preset value L while it outputs a control signal h signifying a rising of the pixel clock PCLK, when the counter value coincides with the phase data signal H. Concurrently with the output of the control signal h, the counter 403 is reset and counts up again from zero to form a continuous pulse train.

The pixel clock generator 1401 receives the phase data signal H at each clock, and generates pixel clocks PCLK whose pulse cycles are sequentially varied. Note that in the present embodiment the pixel clock PCLK is set to be ⅛ of the high frequency clock VCLK, that is, the phase of the pixel clock can be shifted by resolution of ⅛ of the high frequency clock VCLK.

Figure 34:
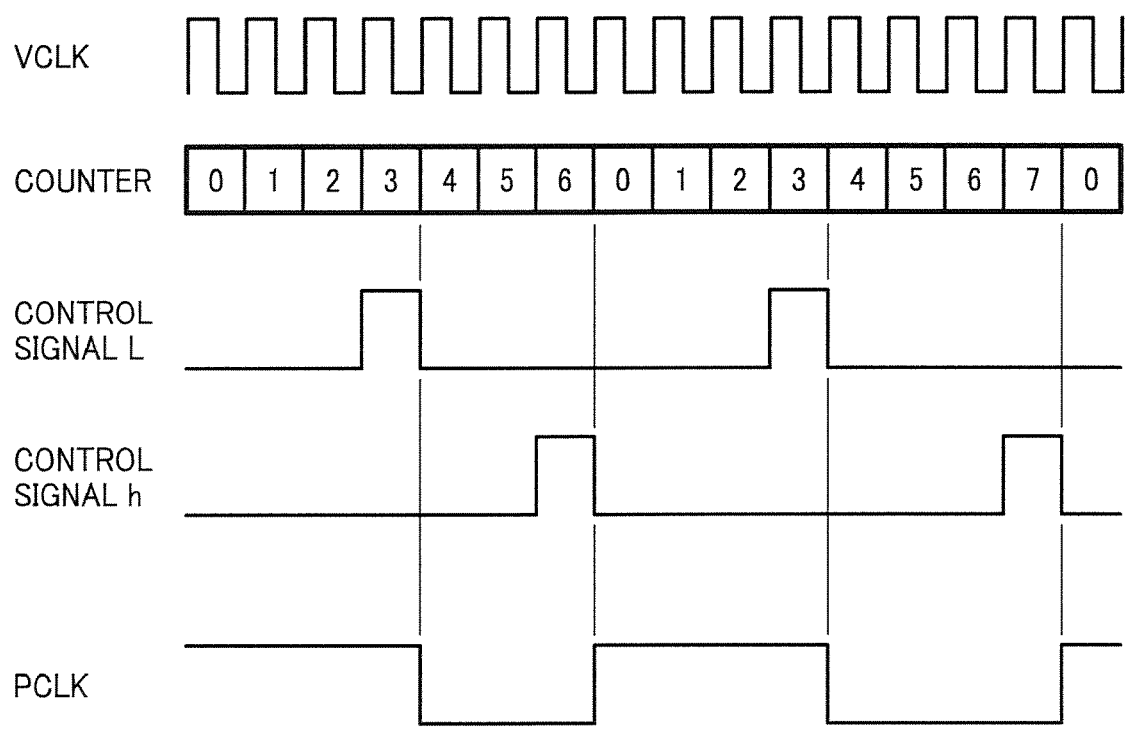
FIG. 34 is timing chart showing a phase shift in an arbitrary pixel.

FIG. 34 is a timing chart for delaying an arbitrary pixel clock PCLK by ⅛ clock when duty ratio is 50% and the preset value is 3, for example. At the value of the counter 1403 being 4, the pixel clock PCLK is fallen. Upon the phase data signal H being 6 given, the pixel clock PCLK is risen at the value of the counter 1403 being 7. Concurrently, the counter 1403 is reset to zero, and at the value of the counter 1403 being 4, the pixel clock PCLK is fallen again. Then, for delaying the pixel clock PCLK in phase by ⅛ clock, when the phase data signal H being 7 is given, the pixel clock PCLK is risen at the value of the counter 1403 being 8. Thereby, the pulse cycles of adjacent pixel clocks PCLK are delayed by ⅛ clock. Thus generated pixel clocks PCLK are supplied to the light source drive unit 1406 which drives the light source according to the pixel clocks and pixel data which is read from the line buffers 1408.

Figure 35:
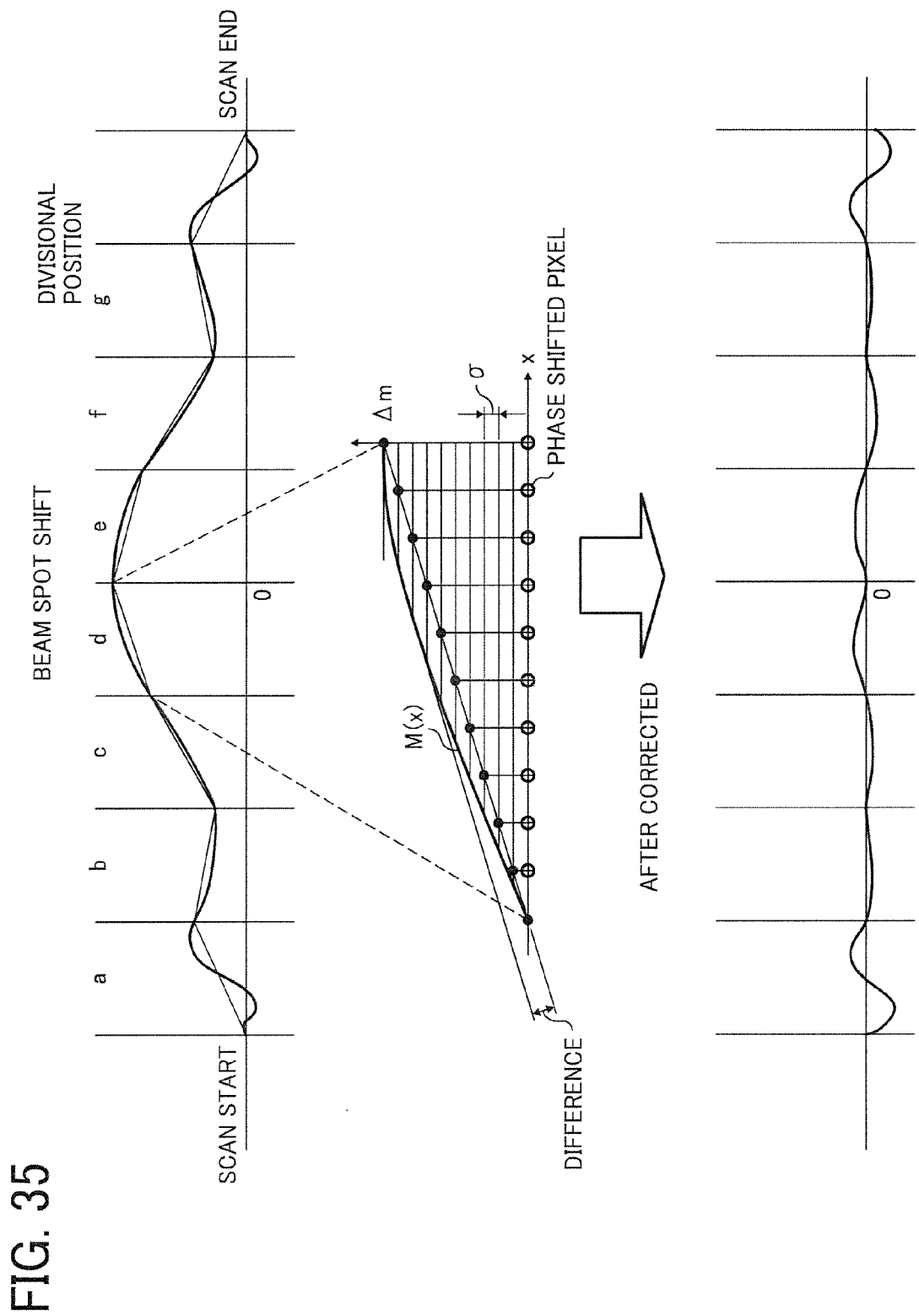
FIG. 35 shows a correction amount for shifts of a focus position of a light beam spot due to the phase shift.

FIG. 35 shows amount of correction for the focus position of the light beam on each pixel. According to the present embodiment, the main scan area (from the scan start to end) is divided into plural areas to correct the focus position of the light beam in each divided area. The interval and phase shift amount of pixels are set as phase data in each divided area as follows.

When L(x) is a variation of magnification at the main scan position, variation M(x) in the shift in the beam spot position is expressed by the following expression:

$$M(x)=\int L(x)dx$$

Moreover, the interval D of pixels for phase shift can be expressed by $$D \approx N/(\Delta m/\sigma)$$

where Δm is a shift in interval between divided areas due to varied magnification in an arbitrary divided area, σ (fixed) is resolution, N is the number of pixels in each divided area, and D is an integer. Accordingly, the pixel can be shifted in phase by σ in every D pixels in order to make the shift in the beam spot position be zero at the start and end points of the divided area. The number of the divided areas need be preset so that a shift in the beam spot position is to be within an allowable range at the middle of each divided area. In the present embodiment, σ is set to ⅛ pixel, and the number of the divided areas is set to 8 and the widths thereof are equal. However, the number or width of the divided areas can be set to an arbitrary value.

This can accordingly correct a partial variation in the magnification by adjusting the pixel interval in the main scan direction so that the main scan resist is to be zero at the borders of the divided areas of the main scan area. That is, the total magnification (total shift in focusing position) is corrected by shifting the pixel clock PCLK to equally adjust the pixel interval. The partial magnification (partial shift in focusing position) is corrected by changing the pixel interval in every predetermined number of pixels.

Figure 36:
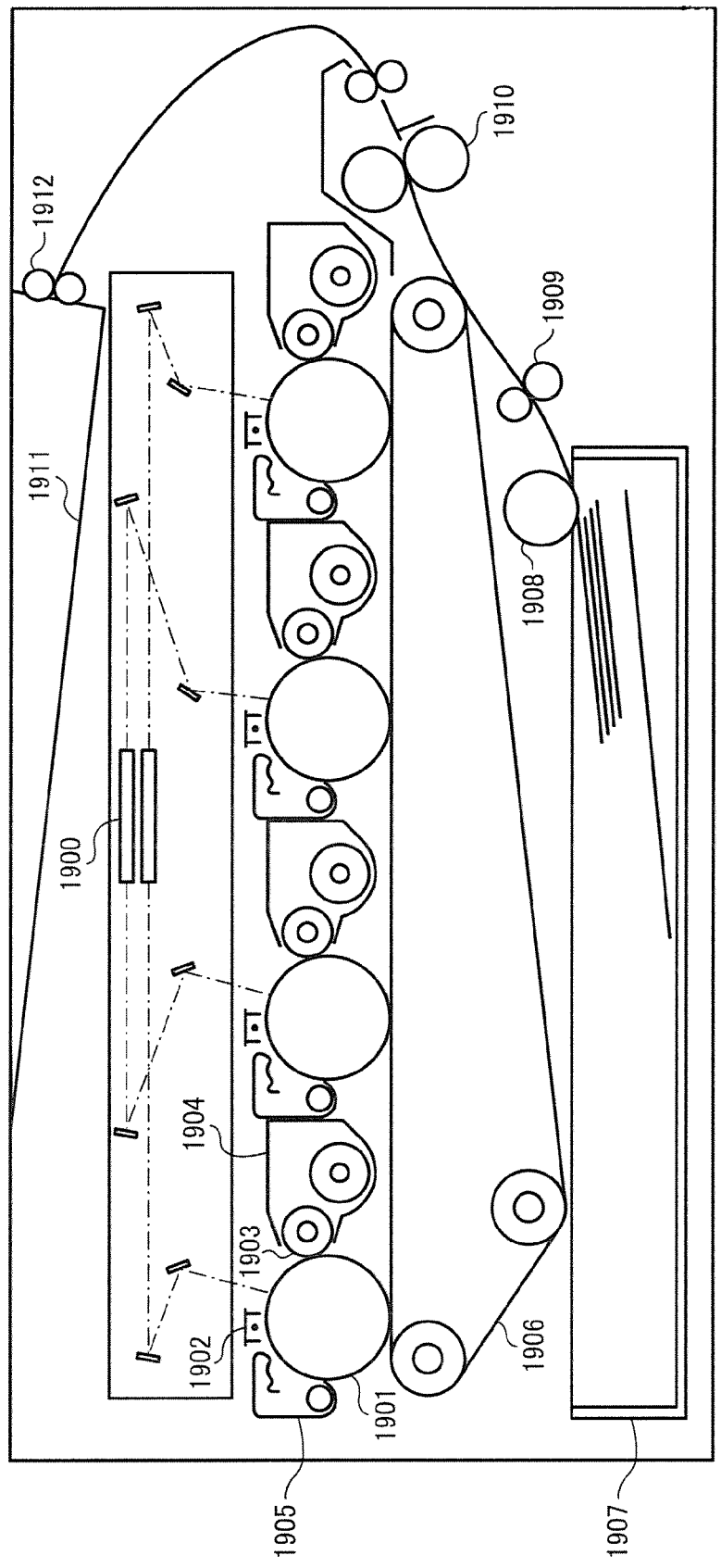
FIG. 36 shows an example of an image formation apparatus incorporating an optical scan apparatus.

FIG. 36 shows an image formation apparatus incorporating an optical scan apparatus. The image formation apparatus comprises an optical scan apparatus 1900, photoconductive drums 1901, electric chargers 1902, develop rollers 1903, toner cartridges 1904, cleaning cases 1905, a transfer belt 1906, a paper feed tray 1907, a paper feed roller 1908, a resist roller pair 1909, a fuse roller 1910, a paper discharge tray 1911, and a paper discharge roller 1912.

Around each photoconductive drum 1901 disposed are the electric charger 1902 charging the photoconductive drum 1901 at a high voltage, the develop roller (develop unit) 1903 attaching charged toner to an electrostatic latent image formed by the optical scan apparatus 1900 for visualization, the toner cartridge 1904 supplying the toner to the develop roller 1903, and the cleaning case 1905 removing and accumulating remnant toner from the photoconductive drum. Image formations for plural lines (4 lines in the present embodiment) are concurrently performed by a single face deflection of the polygon mirror, as described above.

The yellow, magenta, cyan, black image formation stations are disposed in a moving direction of the transfer belt 1906. The structures of the four stations are the same except for colors of toners. The toner images are sequentially transferred and superimposed at a timing onto the transfer belt to form color images.

A sheet of paper is supplied from the paper feed tray 1907 via the paper feed roller 1908 and fed to the transfer belt via the resist roller pair 1909 at the write start timing in the sub scan direction. The four color toner images are transferred onto the sheet of paper by the transfer belt 1906 and fused by the fuse roller 1910 (transfer unit). The sheet of paper with the color image thereon is discharged to the paper discharge tray 1911 via the paper discharge roller 1912.

As exemplified above, the light source unit according to the present invention is configured to accurately position the light source relative to the first support portion. Also, after the relative position is defined by the bias member, the substrate and the first support portion are fixed by the holding member. Accordingly, the relative position between the substrate and the first support portion can be constantly maintained, so that consequently, the positional relation between the coupling element supported by the second support portion and the light source can be constantly maintained.

Further, the light source unit according to the present invention is configured to include the bias member with the anchor portion. Therefore, it is possible to prevent a change in the relative position between the bias member and the substrate.

Further, according to the present invention, the light source unit is configured to include the rotatable adjuster rotating the second support portion for the positional adjustment. Therefore, it is possible to adjust the position of the light source relative to the optical system after the coupling element around the optical axis as well as to accurately define a position of the light source relative to the correction lens and the aperture member. Moreover, it is possible to make amounts of light from the most distant VCSELs constant, preventing deterioration in the characteristics of the light beams such as beam spot size.

Further, according to the present invention, it is possible to prevent a change in the relative position between the substrate and the first support portion when attaching/detaching the wiring to/from the connector or when making the substrate in contact with another component accidentally, in handling the light source for maintenance purpose, for example.

Further, the optical scan apparatus according to the present invention is configured to include the above-described light source unit so that it can scan the scan surfaces of the photoconductive drums stably and accurately without variation in the imaging characteristics of the light beams over time.

Further, the image formation apparatus according to the present invention is configured to include the above-described optical scan apparatus so that it can form accurate images on the recording medium stably.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A light source unit comprising:
   a light source with a plurality of light emission portions two-dimensionally arranged;
   a substrate on which the light source is mounted;
   a first support portion supporting the substrate;
   a bias member biasing the substrate towards the first support portion;
   a coupling element coupling a light beam emitted from the light source;
   a second support portion supporting the coupling element;
   a holding member holding a position of the substrate relative to the first support portion;
   a fitting portion provided in each of the first and second support portions to rotatably fit the first and second support portions into each other around an optical axis of the light source; and
   a fastening member integrally fastening the first and second support portions.

2. A light source unit according to claim 1, wherein:
   the light source unit comprises a light emitting element including a plurality of light emission portions and a package containing the light emitting element; and
   in order to position the light source relative to the first support portion, the bias member biases the substrate towards the first support portion to make the package in contact with the first support portion.

3. A light source unit according to claim 1, wherein
   the bias member comprises an anchor portion which latches the substrate to restrict movement thereof in a direction orthogonal to the optical axis of the light source.

4. A light source unit according to claim 1, further comprising a rotatable adjuster which is configured to rotate the second support portion in a plane orthogonal to the optical axis of the light source for positional adjustment.

5. A light source unit according to claim 1, further comprising a connector mounted on the substrate and connected with a wiring from outside, wherein
   the holding member holds neighborhood of a portion of the substrate on which the connector is mounted.

6. An optical scan apparatus scanning a scan surface with a light beam, comprising:
   a light source unit according to claim 1;
   an optical deflector deflecting a light beam emitted from the light source unit;
   an optical imaging system focusing the light beam deflected by the optical deflector on the scan surface.

7. An image formation apparatus which forms a toner image according to an electrostatic latent image obtained from image information, and fuses the toner image on a recording medium to form an image, comprising:
   an optical scan apparatus according to claim 6;
   a photoconductive drum on which an electronic latent image is formed by the optical scan apparatus;
   a develop unit visualizing the electrostatic latent image formed on the photoconductive drum; and
   a transfer unit fusing the toner image visualized by the develop unit on a recording medium.

* * * * *